(12) United States Patent
Robertsson et al.

(10) Patent No.: US 7,791,980 B2
(45) Date of Patent: Sep. 7, 2010

(54) INTERPOLATION AND EXTRAPOLATION METHOD FOR SEISMIC RECORDINGS

(75) Inventors: Johan Olof Anders Robertsson, Oslo (NO); Lawrence C. Morley, The Woodlands, TX (US)

(73) Assignee: WesternGeco L.L.C., Houston, TX (US)

( * ) Notice: Subject to any disclaimer, the term of this patent is extended or adjusted under 35 U.S.C. 154(b) by 162 days.

(21) Appl. No.: 11/456,103

(22) Filed: Jul. 7, 2006

(65) Prior Publication Data

US 2006/0291328 A1 Dec. 28, 2006

Related U.S. Application Data

(63) Continuation-in-part of application No. PCT/GB2005/001855, filed on May 13, 2005.

(30) Foreign Application Priority Data

May 21, 2004 (GB) ................................ 0411305.6

(51) Int. Cl.
*G01V 1/38* (2006.01)
(52) U.S. Cl. .......................................... 367/24; 367/43
(58) Field of Classification Search ................... 367/24, 367/43
See application file for complete search history.

(56) References Cited

U.S. PATENT DOCUMENTS

| | | | |
|---|---|---|---|
| 3,283,293 A | | 11/1966 | Pavey, Jr. et al. |
| 4,964,098 A * | | 10/1990 | Hornbostel ................... 367/73 |
| 5,235,556 A * | | 8/1993 | Monk et al. .................... 367/63 |
| 5,237,538 A * | | 8/1993 | Linville et al. ................ 367/38 |
| 5,521,881 A * | | 5/1996 | Lau et al. ....................... 367/24 |
| 5,587,965 A | | 12/1996 | Dragoset, Jr. et al. |
| 6,094,620 A * | | 7/2000 | Gasparotto et al. ............ 702/14 |
| 6,161,076 A * | | 12/2000 | Barr et al. ...................... 702/17 |
| 6,169,959 B1 * | | 1/2001 | Dragoset Jr. .................. 702/17 |
| 6,493,636 B1 * | | 12/2002 | DeKok .......................... 367/24 |
| 6,512,980 B1 | | 1/2003 | Barr |
| 6,522,973 B1 * | | 2/2003 | Tonellot et al. ................ 702/16 |
| 6,735,527 B1 * | | 5/2004 | Levin ............................ 702/14 |
| 7,149,630 B2 * | | 12/2006 | Abma ........................... 702/17 |
| 7,181,347 B2 * | | 2/2007 | Moore ........................... 702/14 |
| 7,197,399 B2 * | | 3/2007 | Matson et al. ................. 702/17 |
| 2004/0042341 A1 | | 3/2004 | Tenghamn et al. |
| 2004/0128074 A1 * | | 7/2004 | Herkenhoff et al. ........... 702/14 |

(Continued)

FOREIGN PATENT DOCUMENTS

GB 2 410 551 8/2005

(Continued)

OTHER PUBLICATIONS

Long et al. Multiple Removal Success in the Carnarvon Basin with SRME. APPEA Journal 2005. May 11, 2005. pp. 399-406.*

(Continued)

*Primary Examiner*—Mark Hellner

(57) ABSTRACT

A method includes: interpolating a set of crossline seismic data from a set of acquired multicomponent seismic data; predicting a multiple in the interpolated and acquired seismic data from the combined interpolated and acquired multicomponent seismic data; and suppressing the predicted multiple. Other aspects include a program storage medium encoded with instructions that, when executed by a computing device, perform such a method and a computing apparatus programmed to perform such a method.

30 Claims, 10 Drawing Sheets

U.S. PATENT DOCUMENTS

| | | |
|---|---|---|
| 2005/0065758 A1 | 3/2005 | Moore |
| 2005/0073909 A1* | 4/2005 | Laws et al. .................. 367/15 |
| 2005/0128874 A1* | 6/2005 | Herkenhoff et al. ........... 367/56 |
| 2006/0039238 A1* | 2/2006 | Mandal et al. ................. 367/31 |
| 2006/0050611 A1* | 3/2006 | Borresen ...................... 367/24 |
| 2006/0098529 A1* | 5/2006 | Anderson et al. ............. 367/38 |
| 2006/0133206 A1* | 6/2006 | Barnes ......................... 367/38 |
| 2007/0032954 A1* | 2/2007 | Moore et al. ................... 702/5 |
| 2007/0073488 A1* | 3/2007 | Moore ......................... 702/14 |

FOREIGN PATENT DOCUMENTS

| | | |
|---|---|---|
| GB | 2414299 A * | 11/2005 |
| WO | WO 2005073758 A1 | 8/2005 |
| WO | WO 2005114258 A1 | 12/2005 |

OTHER PUBLICATIONS

U.S. Appl. No. 60/467,376 (Moore et al.), filed May 2, 2003.*

Moore, Ian. "Practical, 3D Surface-related Multiple Prediction (SMP)." 2004 CSEG National Convention, Great Explorations, Canada and Beyond.*

Abma, et al. "3D interpolation of irregular data with a POCS algorithm." Geophysica, vol. 71, No. 6 (Nov.-Dec. 2006).*

Fomel, Sergey. "Seismic reflection data interpolation with differential offset and shot continuation." Geophysics, vol. 68, No. 2 (Mar.-Apr. 2003).*

Ikelle, Luc T. "Combining two seismic experiments to attenuate free-surface mutliples in OBC data." Geophysical Prospecting, 1999, 47, 179-193.* ven Dedem, Ewoud. 3D surface-related multiple elimination. http://personeel.ewi.tudelft.nl/live/binaries/0d45b8ed-84fd-4d52-8dc8-42d99d382809/doc/Dedem_van.pdf.*

Amundsen et al., "Attenuation of free-surface multiples from marine pressure and pressure gradient," $65^{th}$ Mtg. Eur. Assn. Geosci. Eng., p. 192, 2003.

Amundsen, "elimination of free-surface related multiples without need of the source wavelet," Geophysics, 66(1):327-341, 2001.

Carvalho and Weglein, "Examples of a nonlinear inversion method based on the T matrix of scattering theory: application to multiple suppression," $61^{st}$ Ann. Intern. Mtg. SEG Expanded Abstracts, pp. 1319-1322, 1991.

Dragoset and Jericevic, "Some remarks on surface multiple attenuation," Geophysicis, 63(2):772-789, 1998.

Holvik and Amundsen, "Elimination of the overburden response from multicomponent source and receiver seismic data, with source designature and decomposition into PP-, PS-, SP-, and SS-wave responses," Geophysics, 70(2):S43-S59, 2005.

Kraaijpoel, "Seismic ray fields and ray field maps: theory and algorithms," Utrecht University, 2003.

Riley and Claerbout, "2-D multiple reflections," Geophysics, 41(4):592-620, 1976.

van Borselen, Fokkema and van den Berg, "Removal of surface-related wave phenomena—The marine case," Geophysics, 61(1):202-210, 1996.

Verschuur, Berkhout and Wapenaar, "Adaptive surface-related multiple elimination," Geophysics, 57(9):1166-1177, 1992.

Verschuur, "Surface-related multiple elimination in terms of Huygens' sources," J. Seismic Exploration, 1:49-59, 1992.

Wiggins, "Attenuation of complex water-bottom multiples by wave-equation-based prediction and subtraction," Geophysics, 53(12):1527-1539, 1988.

PCT Search Report, dated Sep. 30, 2008, for Application No. PCT/US2007/072266.

Long, et al, Multiple Removal Success in the Carnarvaron Basin with SMRE, APPEA Journal, 2005, vol. 45, pp. 399-406.

* cited by examiner

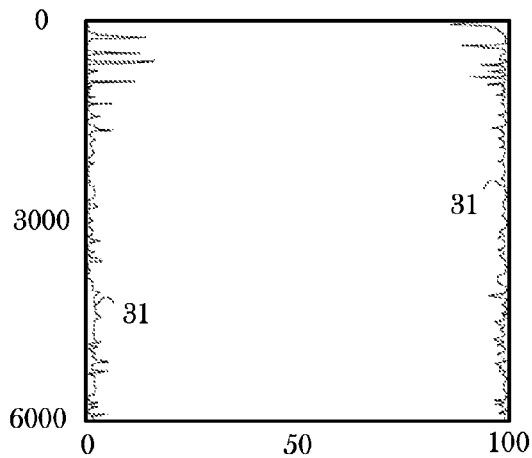
FIG. 3A
FIG. 3B
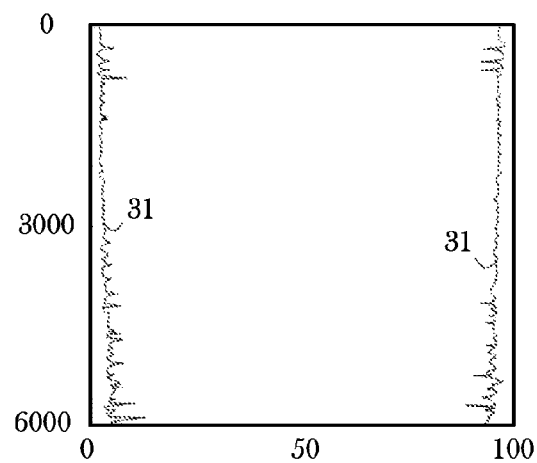
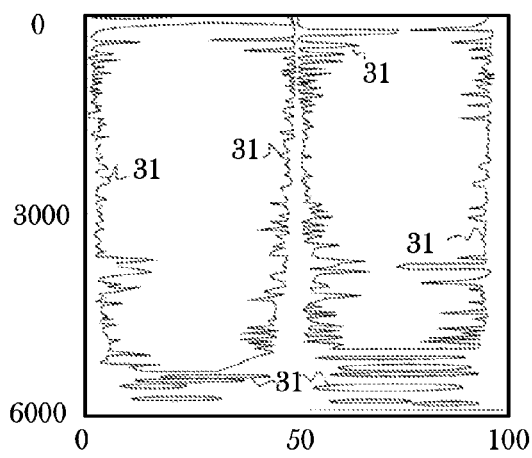
FIG. 3C

INTERPOLATION AND EXTRAPOLATION METHOD FOR SEISMIC RECORDINGS

This is a continuation-in-part of co-pending International Application PCT/GB2005/001855, filed May 13, 2005, published Dec. 1, 2005, as Publication No. 2005/114258, now pending, and claiming priority to application Ser. No. GB 2 414 299 A, filed May 21, 2004, in the United Kingdom, which is hereby incorporated by reference for all purposes as if set forth verbatim herein.

BACKGROUND OF THE INVENTION

1. Field of the Invention

The present invention generally relates to methods of interpolating and extrapolating seismic recordings. It particularly relates to such methods, where the seismic recordings are obtained using one or more multicomponent towed marine receiver cables or streamers, and especially for use in multiple suppression in such seismic recordings.

2. Description of the Related Art

In the field of seismic exploration, the earth interior is explored by emitting low-frequency, generally from 0 Hz to 200 Hz, acoustic waves generated by seismic sources. Refractions or reflections of the emitted waves by features in sub-surface are recorded by seismic receivers. The receiver recordings are digitized for processing. The processing of the digitized seismic data is an evolved technology including various sub-processes such as noise removal and corrections to determine the location and geometry of the features which perturbed the emitted wave to cause reflection or refraction. The result of the processing is an acoustic map of the earth interior, which in turn can be exploited to identify for example hydrocarbon reservoirs or monitor changes in such reservoirs.

Seismic surveys are performed on land, in transition zones and in a marine environment. In the marine environment, surveys include sources and receiver cables (streamers) towed in the body of water and ocean bottom surveys in which at least one of sources or receivers are located at the seafloor. Seismic sources and/or receivers can also be placed into boreholes.

The known seismic sources include impulse sources, such as explosives and airguns, and vibratory sources which emit waves with a more controllable amplitude and frequency spectrum. The existing receivers fall broadly speaking into two categories termed "geophones" and "hydrophones", respectively. Hydrophones record pressure changes, whereas geophones are responsive to particle velocity or acceleration. Geophones can recorded waves in up to three spatial directions and are accordingly referred to as 1C, 2C or 3C sensors. A 4C seismic sensor would be a combination of a 3C geophone with a hydrophone. Both types of receivers can be deployed as cables with the cable providing a structure for mounting receivers and signal transmission to a base station. Such cables fall into two distinct categories: one being so-called ocean-bottom cables which maintain contact with the sea-floor, while the second category is known as streamers which are towed through the water without touching the sea-floor.

Presently, the seismic industry is in the process of developing multi-component cables or streamers. Multicomponent streamers include a plurality of receivers that enable the detection of pressure and particle velocity or time derivatives thereof. In so-called dual sensor towed streamers, the streamer carries a combination of pressure sensors and velocity sensors. The pressure sensor is typically a hydrophone, and the motion or velocity sensors are geophones or accelerometers. In the U.S. Pat. No. 6,512,980, entitled "Noise reference sensor for use in a dual sensor towed streamer", issued Jan. 28, 2003, in the name of the inventor Frederick J. Barr ("the '980 Patent"), a streamer is described carrying pairs of pressure sensors and motion sensors combined with a third sensor, a noise reference sensor. The noise reference sensor is described as a variant of the prior art pressure sensor.

In the United Kingdom patent application GB 0402012.9, there is proposed a streamer having a plurality of compact clusters of hydrophones. The streamer is adapted to provide gradient measurements of pressure, which in turn can be readily transformed into particle velocity data.

The main motivation for developing multi-component streamers has been to decompose the recorded data into its up- and down-going components, i.e., to free the data of "ghosts" caused by reflection at the sea surface.

On the other hand, the seismic industry has since long experienced the need to interpolate or extrapolate trace recordings into areas void of receivers. Normally the wavefield and/or its derivatives are only known at a number of discrete locations. However, in practice it is often desirable to extend the knowledge of the wavefield to other points using interpolation, extrapolation or a combination of extrapolation arid interpolation, sometimes known as intrapolation. Such techniques are applied, for example, to determine pressure data along the streamer, away from a streamer, at near-source offsets, or between two adjacent streamers.

One particular undesirable event in marine seismic surveying is the occurrence of what are known as "multiple reflections", or "multiples." In a seismic survey, as the seismic waves strike interfaces between subterranean formations, a portion of the seismic waves reflects back through the earth and water to the seismic receivers, to be detected, transmitted, and recorded. Seismic waves, however, reflect from interfaces other than just those between subterranean formations, as would be desired.

Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples".

A variety of techniques are known to the art for "suppressing" or "attenuating" multiples in seismic data. Some of these techniques employ a form of interpolation in the manner mentioned above. For instance, some techniques predict what the multiples will look like from the collected data and then eliminate the effects of the multiples in the data. That is, some multiple suppression techniques interpolate "inline" data, or an estimate of data that would have been acquired at other locations on the streamer had receivers been positioned at those other locations.

However, these interpolation techniques fail to interpolate in the crossline direction, leaving a paucity of data in some areas where it is desired. Consider, for instance, a multiple prediction technique known as Surface Related Multiple Elimination ("SRME"). An excellent review of SRME can be found in Dragoset, W. H. and Jericevic, Z., "Some Remarks on Surface Multiple Attenuation", 63 Geophysics 772-789 (1988), which is hereby incorporated by reference for all purposes as if set forth verbatim herein. Three dimensional ("3D")-SRME has been one of the more successful but computationally-demanding processing approaches to the suppression of marine surface-related multiples. The crux of the method is the capture and re-use of the recorded seismic wavefield as a simulated secondary source to predict and subsequently remove the multiple train via the 3D acoustic wave-equation. The Achilles heel of the method in conventional surveys has been the limited crossline aperture of the recorded data. This distorts the full 3D simulation of the multiple wavefield and limits the efficacy of the method.

The present invention is directed to resolving, or at least reducing, one or all of the problems mentioned above.

SUMMARY OF THE INVENTION

The invention, in its various aspects and embodiments, includes a method comprising: interpolating a set of crossline seismic data from a set of acquired multicomponent seismic data; predicting a multiple in the interpolated and acquired seismic data from the combined interpolated and acquired multicomponent seismic data; and suppressing the predicted multiple. In other aspects and embodiments, the invention also includes a program storage medium encoded with instructions that, when executed by a computing device, perform such a method and a computing apparatus programmed to perform such a method.

BRIEF DESCRIPTION OF THE DRAWINGS

The invention may be understood by reference to the following description taken in conjunction with the accompanying drawings, in which like reference numerals identify like elements, and in which:

FIG. 3A-FIG. 3C compare the performance of interpolations with increasing order in accordance with examples of the invention at one dB value;

FIG. 4A-1-FIG. 4C-2 compare the performance of interpolations with increasing order in accordance with examples of the invention at a range of dB values.

Figure 1A:
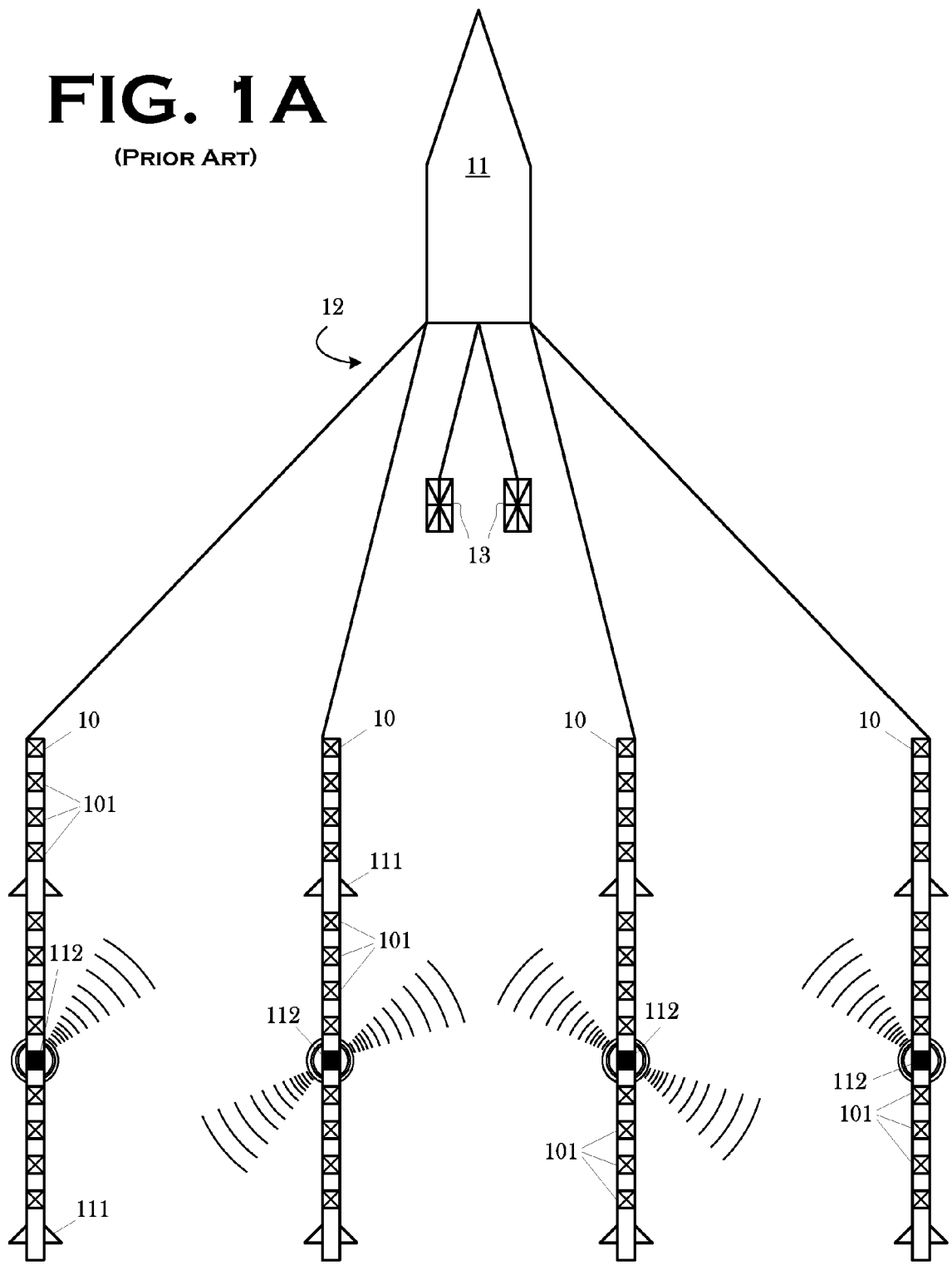
FIG. 1A-FIG. 1B illustrate a typical marine seismic survey with towed streamers.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In an aspect of the invention the measured data from a multi-component streamer are used to derive a filter which interpolates or extrapolates pressure data away from the location of the streamer.

The filter is preferably based on an expansion series of the pressure data.

An expansion series is generally defined as a representation of the function or data set by means of a sum of increasing higher derivatives of the function or data set at a point or the space surrounding a point. One of the most used expansion series is the Taylor series. Whereas Taylor series are generally not suitable for extrapolating oscillatory functions over great distances, the invention is based on the realization that in seismic applications the waves arrive at the receivers with near vertical incidence.

For certain applications, in particular for intrapolation between known points of the data set, it is a preferred variant of the present invention to use a Taylor series with modified weighting, more preferably weighting known as barycentric or triangular weighting.

Though expansion series have been proposed in seismic theory, they were severely restricted in real application because such expansions lead to cross-line terms which are difficult to evaluate. Lack of accurate particle velocity caused further problems: without such data, the errors made by intra- and extrapolation render the results unreliable. It has now been found that multi-component streamers are capable of providing sufficiently accurate particle velocity related data either directly or indirectly.

In a preferred embodiment of the invention, first-order cross-line derivatives of data in the filter or expansion series are substituted by in-line derivatives. In a more preferred embodiment of the invention first-order and 13 second-order cross-line derivatives of data in the filter or expansion series are substituted by in-line derivatives.

In a preferred embodiment the expansion series is accurate to a first-order, more preferably to the second-order expansion term. Clearly, it is desirable to extend the series into the highest order permitted by the available computing power.

However, the terms involve more and more complex derivatives of the measured data. Hence such an extension is preferably limited to the term which can be replaced or expressed in terms of accurately measured data.

In a preferred embodiment functions, preferably linear functions of particle velocity related data and in-line pressure data are used to replace higher cross-line derivatives of pressure data in the expansion series.

Herein, the terms 'in-line"and "cross-line" are used in their conventional meaning in the seismic industry, hence, as the direction along the main streamer axis and the direction perpendicular to it, respectively. The derivatives used are preferably spatial derivatives and more preferable spatial derivatives in in-line direction.

The methods described herein can be used for many applications, including but not limited to extrapolating into a direction away from a streamer, intrapolating into a space between two streamers, even in case that one of the streamers is not a multi-component streamer, intrapolating into a direction along a streamer, or intrapolating into a space closer to a seismic source.

It is advantageous to be capable of intrapolating into a direction along a streamer to maximize or otherwise optimize receiver spacing in the streamer.

Interpolation of marine seismic recordings is fundamental to processing of 3D seismic data. Applications include imaging and multiple treatment (short source-receiver offsets, cross-line receiver locations, etc.). The present invention can allow for better 3D solutions to, for instance, imaging and multiple problems as well as significantly increasing efficiency of marine seismic operations.

In addition, time-lapse is an important application area where interpolation/extrapolation of actual receiver locations to those in the legacy data can be critical to isolate the time-lapse response from noise introduced by deviations from the ideal time-lapse survey.

The methods of the present invention can also be beneficial in multiple treatment and imaging as well as in time-lapse applications or other application where a regularization of data location has an advantage.

The methods of this invention can also be used to interpolate/extrapolate into vertical (z) direction.

Figure 1B:
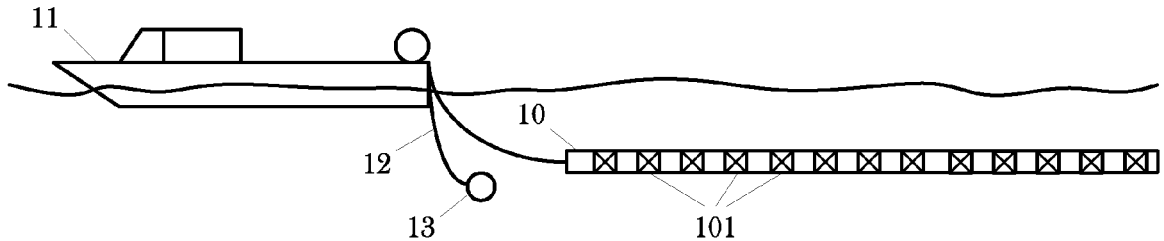

A typical marine seismic acquisition is illustrated in FIG. 1A and FIG. 1B, which show a schematic top and side view on a marine seismic survey. Four instrumented cables or streamers 10 are towed by a ship 11. A front network 12 and a similar tail network (not shown) are used to connect the vessel and the streamers. Embedded in the front network are seismic sources 13, typically an array of airguns. Each streamer 10 is typically assembled from many receiver holder segments that are coupled to make up the streamer. Between segments, the streamers carry controllable deflectors 111 (often referred to as vanes or 'birds") and other aids for steering the streamer along a desired trajectory in a body of water.

The accurate positioning of modern streamers is controlled by a satellite based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals.

The main purpose of a streamer 10 is to carry a large number of seismic receivers 101 which are distributed along its length. In FIG. 1A and FIG. 1B, the receivers are schematically depicted as marked boxes. Each receiver can be either two or more hydrophones arranged in a plane orthogonal to the streamer axis as described in the United Kingdom Patent Application No. GB 0402012.9 filed on Jan. 30, 2004.

Alternatively, each receiver may be a dual sensor as described in the '980 Patent, fully referenced above.

During the survey, the source 13 is fired at intervals and the receivers 101 "listen" within a frequency and time window for acoustic signals such as reflected and/or refracted signals that are caused by seismic features in path of the emitted wavefield. As a result of such a survey, a set of pressure data P(x,y,t) and, by making use of the multi-component capability of the streamer, a set of velocity related data:

$$V(x,y,t) = (V_x(x,y,t), V_y(x,y,t), V_z(x,y,t)) \quad (1)$$

are obtained at locations x, y and times t. Note that the recorded data generally only available along 1D curves in 3D space following the streamers. Typically the streamers are approximately located in an xy-plane at roughly a constant depth z. The velocity is a vector with for example components in x, y and z directions.

Figure 5:
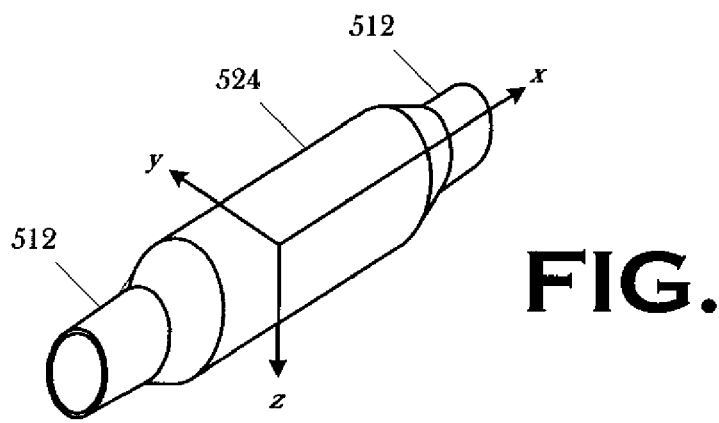
FIG. 5 illustrates the Cartesian coordinate system employed in the description of the illustrated embodiment.

The coordinates are Cartesian coordinates, as illustrated in FIG. 5, with x as in-line direction, which is a direction parallel to the main axis of the seismic cable 10, and y as cross-line direction perpendicular to the seismic cable 10 axis and parallel to the (ideal) sea surface or plane in which the parallel streamers are towed. The z direction is taken to be vertical and orthogonal to x and y.

Applying the well-known Taylor's theorem, an analytic wavefield can be extrapolated away from a location where the wavefield and its derivatives are known:

$$P(x + \Delta x, y + \Delta y) = P(x,y) + [\Delta x \partial_x P(x,y) + \Delta y \partial_y P(x,y)] + \\ \frac{1}{2!}[(\Delta x)^2 \partial_{xx} P(x,y) + 2\Delta x \Delta y \partial_{xy} P(x,y) + (\Delta y)^2 \partial_{yy} P(x,y)] + \\ \frac{1}{3!}[(\Delta x)^3 \partial_{xxx} P(x,y) + 3(\Delta x)^2 \Delta y \partial_{xxy} P(x,y) + \\ 3\Delta x (\Delta y)^2 \partial_{xyy} P(x,y) + (\Delta y)^3 \partial_{yyy} P(x,)] + O(\Delta^4) \quad (2)$$

where $O(\Delta^n)$ indicates the order of terms neglected in the Taylor expansion (n=4 in Eq. (2)) and the operator $\partial_x$ denotes a spatial partial derivative—in this instance with respect to the x-direction. The Taylor series is infinite and is valid for extrapolation any distance away from the location where the wavefield and its derivatives are known. The range of the extrapolation is limited by truncating the Taylor series. In the following examples pressure data are extrapolated.

An application of the general equation of motion yields $$\partial_x P(x,y) = \rho \dot{V}_x(x,y), \quad (3)$$

and $$\partial_y P(x,y) = \rho \dot{V}_y(x,y), \quad (4)$$

where $\dot{V}_x$, $\dot{V}_y$ denote time derivatives of $V_x$ and $V_y$, respectively, and $\rho$ is the density of water. Using Eq. (4) to replace the cross-line derivative of the pressure, all the terms required for the first-order accurate Taylor expansion of pressure away from the multicomponent streamer are available:

$$P(x+\Delta x, y+\Delta y) = P(x,y) + [\Delta x \partial_x P(x,y) + \Delta y \rho \dot{V}_y(x,y)] + O(\Delta^2). \quad (5)$$

In Eq. (5), the option exists of expressing in-line derivatives with respect to pressure in terms of derivatives of in-line component of particle velocity through Eq. (3). However, in the examples, the in-line derivatives of pressure are used throughout. A variant of Eq. (5) can be applied to expansions into z-direction.

The second-order cross-line derivative of pressure from a multicomponent streamer towed in the vicinity of the sea surface (e.g., at 6 m depth) can be expressed as:

$$\partial_{yy} P(x, y) = \frac{3}{1 + \frac{2}{15}k^2 h^2} \left[ \frac{k \cot(kh)}{h} P(x, y) - \frac{i\omega\rho}{h} V_z(x, y) \right] - \partial_{xx} P(x, y) + O(h) \quad (6)$$

Eq. (6) is expressed in the space-frequency domain, h denotes the instantaneous depth of each recording element as a function of time and space, and k=ω/c is the wavenumber where ω is the angular frequency and c is the velocity in water. In order to be applicable for a time-variant rough sea, a space-time implementation using compact filters of Eq. (6) is used. This can be done successfully either by approximating the k-dependent terms by truncated Taylor expansions (equivalent to time-derivatives in the time domain) or by overlapping triangular windows where the wave-height is considered constant within each window.

Combining Eq. (2), Eq. (4), and Eq. (6), the Taylor expansion of pressure away from the multi-component streamer can be written as accurate up to the second order:

$$P(x + \Delta x, y + \Delta y) = P(x, y) + [\Delta x \partial_x P(x, y) + \Delta y \rho \dot{V}_y(x, y)] + \quad (7)$$
$$\frac{1}{2}[(\Delta x)^2 \partial_{xx} P(x, y) + 2\Delta x \Delta y \rho \partial_x \dot{V}_y(x,)] +$$
$$\frac{(\Delta y)^2}{2} \left[ \frac{3}{1 + \frac{2}{15}k^2 h^2} \left[ \frac{k \cot(kh)}{h} P(x, y) - \frac{i\omega\rho}{h} V_z(x, y) \right] - \partial_{xx} P(x, y) \right] + O(\Delta^3)$$

Having derived expressions of the first- and second-order Taylor expansion in terms of measurable data, these expressions can be applied as filter to various problems of interest to seismic exploration and data analysis. A practical filter may approximate analytical expressions such as derivatives by their corresponding finite difference approximations.

Figure 2:
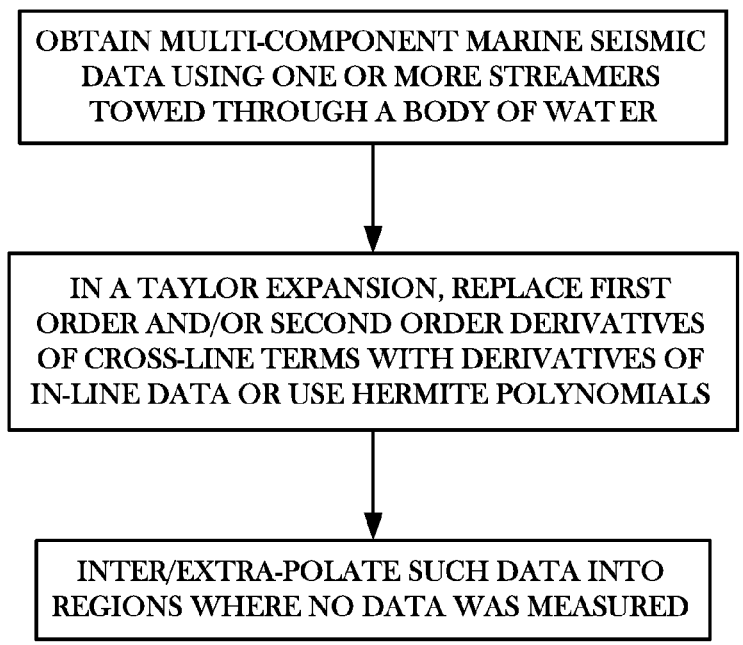
FIG. 2 is a diagram illustrating steps in accordance with an example of the invention.

As is shown in FIG. 2, the applications for filters in accordance with the invention include generally the steps of obtaining the multi-component data using a multi-component streamer (step 21), using an expansion equation with cross-line terms replaced as described above (step 22), and using suitable computing devices to determine the inter- or extrapolated data (step 23).

The first of such problems relates to the interpolation and intrapolation of pressure data in the direction along a streamer so as to derive values of the dataset at points between the locations of receivers.

The problem of interpolating a wavefield between two points where the value of the wavefield and some of its derivatives are known is well-known in one dimension and is solved by fitting Hermite polynomials to the data.

The multi-component streamer will have some redundancy in in-line measurements if both P and $V_x$ are recorded. This redundancy may be exploited to attenuate noise in a multi-component streamer. For the case where there are recordings of both P and $V_x$ and in order to suppress noise on P by means of filtering the maximum required sensor spacing can be relaxed, if a sufficiently dense grid of data values can be generated through interpolation. As the noise on the geophone components will be spatially aliased, this method may require a model for predicting the noise on the geophone components once it is known on the pressure components.

Hermite polynomials allow us to interpolate P data from neighboring P and $V_x$ recordings between x=$x_0$ and x=$x_1$ even though the slowest propagating noise mode may be spatially aliased on the P recordings themselves:

$$P(x, y_0) = P(x_0, y_0)(2s^3 - 3s^2 + 1) + P(x_1, y_0)(-2s^3 + 3s^2) + \rho \dot{V}_x(x_0, y_0)(s^3 - 2s^2 + s) + \rho \dot{V}_x(x_1, y_0)(s^3 - s^2) \quad (8)$$

where the Hermite polynoms are written as a function of:

$$s = \frac{(x - x_0)}{(x_1 - x_0)} \quad (9)$$

A second application is the extrapolation away from a streamer.

To extrapolate pressure data away from a multicomponent steamer, but not into the direction of another multicomponent streamer, a one-dimensional Hermite interpolation can be applied along the streamer to the point along the streamer that has the shortest distance to the point to which the data is to be extrapolated. The interpolation along the streamer can be performed to an arbitrary degree of accuracy by computing derivatives in the streamer direction of the different terms needed for the Taylor extrapolation (Eq. (5) or Eq. (7)) with spectral accuracy, provided that the required terms are not spatially aliased.

The Hermite interpolation, however, cannot be arbitrarily extended as by including ever higher-order derivatives more noise will be amplified.

The third problem relates to the interpolation and intrapolation of pressure data between two multi-component streamers.

A Hermite interpolation can likely not be used cross-line in between the streamers as the terms for a subsequent Taylor extrapolation probably are aliased. Instead, one needs to derive a modified form of the Taylor intrapolation formulae to constrain the extrapolated wavefield between the neighboring streamers for this special case.

If the wavefield and its derivatives are known at the corners of a triangle and one would like to interpolate the wavefield to a point in the interior of the triangle, a first possible method is to use a 2D Taylor expansion for each of the three points (Eq. (1)) and then linearly interpolate or weight the three values according to their barycentric weights. However it has been shown that this will result in an intrapolated wavefield with one degree of accuracy less than what can be achieved if the Taylor expansion coefficients are modified slightly such that the interpolants are forced to fit the data at all corners of the triangle and not only one at a time. An example of the modified Taylor expansion can be found for example in a recent thesis by D. Kraaijpoel, "Seismic Ray Fields and Ray Field Maps: Theory and Algorithms", Utrecht University (2003).

Hence, to intrapolate the wavefield between two multi-component streamers the domain of receiver locations is triangulated such that each point in between the two streamers falls within a triangle with a receiver location at each corner. The wavefield is then extrapolated from each of the three recording locations to the interior point using the modified Taylor expansion. The data are then averaged using barycentric (triangular) weighting. The first- and second-order modified Taylor expansions of pressure are (see for example Kraaijpoel, 2003):

$$\tilde{P}(x+\Delta x, y+\Delta y) = P(x, y) + \frac{1}{2}\begin{bmatrix} \Delta x \partial_x P(x, y) + \\ \Delta y \rho \dot{V}_y(x, y) \end{bmatrix} + O(\Delta^2) \quad (10)$$

for the first-order expansion and as second-order expansion:

$$\tilde{P}(x+\Delta x, y+\Delta y) = \quad (11)$$
$$P(x, y) + \frac{2}{3}\begin{bmatrix} \Delta x \partial_x P(x, y) + \\ \Delta y \rho \dot{V}_y(x, y) \end{bmatrix} + \frac{1}{6}\begin{bmatrix} (\Delta x)^2 \partial_{xx} P(x, y) + \\ 2\Delta x \Delta y \rho \partial_x \dot{V}_y(x, y) \end{bmatrix} +$$
$$\frac{(\Delta y)^2}{6}\left[\frac{3}{1+\frac{2}{15}k^2h^2}\left[\frac{k\cot(kh)}{h}P(x, y) - \frac{i\omega\rho}{h}\right] - \partial_{xx}P(x, y)\right] +$$
$$O(\Delta^3).$$

There are different coefficients in front of the terms in Eq. (10) and Eq. (11) compared to the traditional Taylor expansions (Eq. (5) and Eq. (7)). Eq. (10) and Eq. (11) are best used when interpolating data in 2D and not for extrapolation. The triangularization can also be used when intrapolating between streamers on highly degenerated triangles. One side of such triangles is formed by the receiver spacing while the other two are determined by the much larger distance between streamers. Thus the above equations can be applied in the limit of Δx→0.

A fourth problem to which methods in accordance with the present invention can be applied is the intrapolation of pressure data at near source offsets.

Figures 1, 4A:
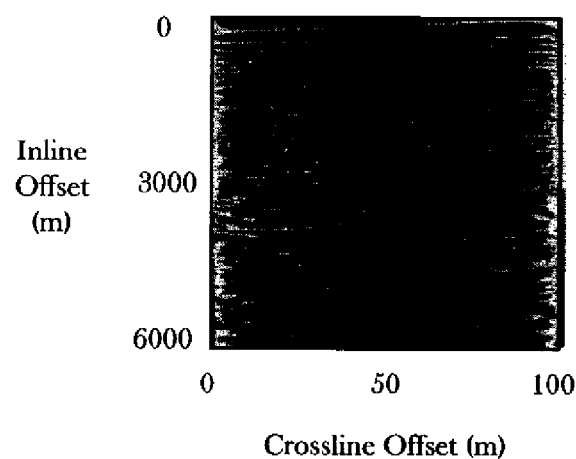
Figures 2, 4A:
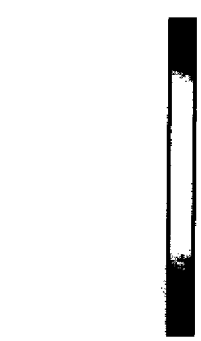
Figures 1, 4B:
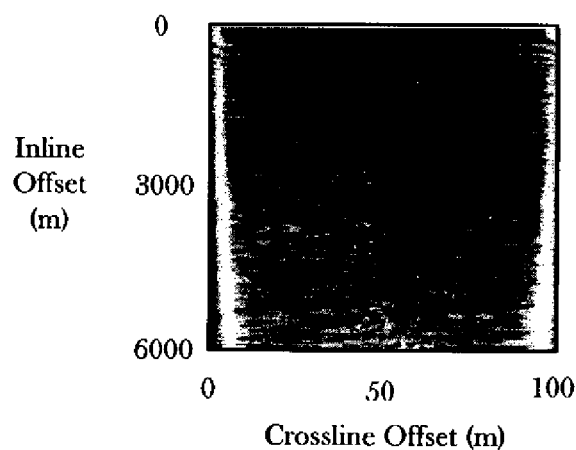
Figures 2, 4B:
Figures 1, 4C:
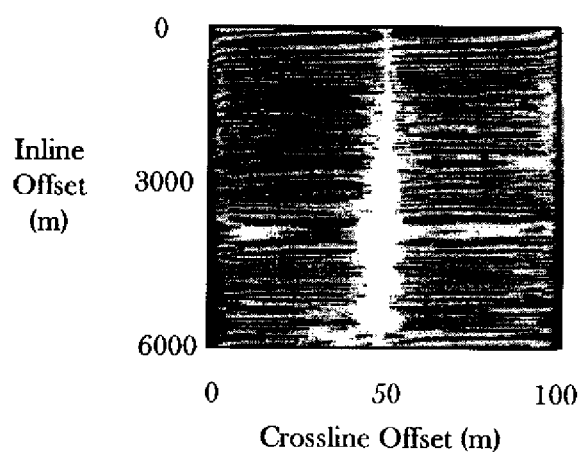
Figures 2, 4C:

This is a special case particularly important for applications in the field of multiple suppression. Generally, a survey obtains data from multiple adjacent streamers as shown in FIG. 1. But no data are available in the region closer to the source. However, at the source location symmetry conditions can be used in the interpolation such that the pressure data are symmetric across the location of the source. In other words, a Taylor expansion of the wavefield away from the source location will only contain even terms which are symmetric (pressure, second derivatives of pressure, etc.), but no odd terms which are anti-symmetric. The argument is correct for the direct wave and for the case of a one-dimensional (1D) model of the Earth but breaks down with variations in the sub surface. However, the symmetry is likely to be a strong additional constraint for extrapolation to near offsets. If the near-field source signature is known (e.g., by using the CMS™ technology of Western-Geco), then such information may be added to constrain the interpolation of the direct arrival.

Finally, another special case is that of a multi-component streamer towed parallel to a conventional streamer recording P data only (P and all in-line spatial derivatives are known). Also for this case a modified form of the Taylor intrapolation formulae as above to constrain the extrapolation is likely to benefit from the fact that the pressure wavefield and its in-line derivatives are known along the conventional streamer.

To numerically test the performance of the above-described methods, a noise free ray-based 3D synthetics was generated using a 50 Hz monochromatic source. The source was placed at the origin at 6 m depth below the sea surface. Recordings were made at 6 m below the sea surface. A primary reflection was simulated from a reflector with a reflection coefficient of 1. The medium between source, receivers and the reflector was taken to be homogeneous with a velocity of 1500 m/s. The sea surface was modeled as a flat reflector with a reflection coefficient of −1. The receiver-side ghost was included in the synthetics.

The plots of FIG. 3A to FIG. 3C illustrate the error between the correct response and the intrapolated response in case of the reflector being located at a depth of 2500 m below the source and a cross-line dip of 10°. The dip results in a wave arriving at 20° angle at the receivers.

The −26 db contour is shown as lines 31. The ordinate shows the inline distance from the source location, while the abscissa is the cross-line offset or distance with a streamer located at the left border and second streamer located at the right border of the plot. The distance between the two streamers is set to be 100 m.

The plot of FIG. 3A is the intrapolation using pressure data only, hence the data available from two conventional streamers. In FIG. 3B, a first-order intrapolation using Eq. (10) is shown and in FIG. 3C the second-order intrapolation of Eq. (11) is used. With increasing order of interpolation, accurate data can be calculated in increasing distance from the location of the receivers. In FIG. 3C the −26 dB contour line 31, is split into several regions.

Full colored plots of the FIG. 3A-FIG. 3C are added as FIG. 4A-1-FIG. 4C-2, although rendered in black and white. The three plots of FIG. 4A-1-FIG. 4C-2 illustrate the accuracy that one would achieve when interpolating the recorded data using recorded pressure data only; recorded pressure data and the recorded cross-line component of particle motion; and recorded pressure data, recorded cross-line component of particle motion and second-order cross-line derivative of P as estimated from recorded vertical component of particle motion and recorded pressure data (see Eq. (6)), respectively.

Figure 6:
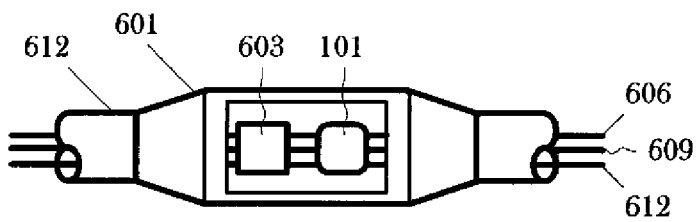
FIG. 6 conceptually depicts a sensor arrangement used in the survey for one particular embodiment.

In one particular embodiment, the invention employs particle motion data as part of the acquired multicomponent seismic data. The streamers 10 house the seismic receivers 101 in instrumented sondes 600 with a particle motion sensor 603, conceptually shown in FIG. 6. The particle motion sensors 603 measure not only the magnitude of passing wavefronts, but also their direction. The sensing elements of the particle motions sensors may be, for example, a velocity meter or an accelerometer. Suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Peavey, Jr. et al. as inventors, and issued Nov. 1, 1966.

Any suitable particle motion sensor known to the art may be used to implement the particle motion sensor 603. Thus, it would be possible to distinguish data representing upwardly propagating wavefronts from the downwardly propagating wavefronts.

In general, it is desirable for the noise measurements of the particle motion sensors 603 be taken as close to the point the seismic data is acquired by the acoustic sensors 101 as is reasonably possible. More distance between the noise data acquisition and the seismic data acquisition will mean less accuracy in the measurement of noise at the point of seismic data acquisition. However, it is not necessary that the particle motion sensor 603 be positioned together with the acoustic sensor 101 within the sensor sonde 600. The particle motion sensor 603 need only be located sufficiently proximate to the acoustic sensor 101 that the noise data it acquires reasonably represents the noise component of the acquired seismic data.

Thus, a multicomponent streamer contains pressure recordings as well as recordings of particle motion. The equation of motion teaches us how to compute the gradient of the pressure data straight from the particle motion recordings, see the '299 application. In addition as also noted in the '299 application, the Laplacian of the pressure wavefield can also be computed when the multicomponent streamer is towed in the vicinity of the sea surface. With first- and possibly higher-order derivatives of the pressure wavefield available we can rely on interpolation techniques to provide better spatially sampled data (according to the Nyquist sampling theorem) even though the multicomponent streamers themselves are spaced too far apart to allow for interpolation using the pressure data only.

The sensors of the instrumented sondes 600 transmit data representative of the detected quantity over the electrical leads of the streamer 10. The data from the acoustic sensors 101 and the particle motion sensors 603 may be transmitted over separate lines. However, this is not necessary to the practice of the invention. However, size, weight and power constraints will typically make this desirable. The data generated by the particle motion sensor 603 will therefore need to be interleaved with the seismic data. Techniques for interleaving information with this are known to the art. For instance, the two kinds of data may be multiplexed. Any suitable techniques for interleaving data known to the art may be employed.

As those in the art will appreciate, a variety of signals are transmitted up and down the streamer 10 during the seismic survey. For instance, power is transmitted to the electronic components (e.g., the acoustic sensor 101 and particle motion sensor 603), control signals are sent to positioning elements (not shown), and data is transmitted back to the vessel 610. To this end, the streamer 10 provides a number of lines (i.e., a power lead 606, a command and control line 609, and a data line 612) over which these signals may be transmitted. Those in the art will further appreciate that there are a number of techniques that may be employed that may vary the number of lines used for this purpose. Furthermore, the streamer 10 will also typically include other structures, such as strengthening members (not shown), that are omitted for the sake of clarity.

As was mentioned above, the interpolation technique described herein may find application in multiple suppression. Accordingly, as noted above, the present invention therefore employs, in another aspect, an interpolation/intrapolation technique. The art has since long experienced the need to interpolate or extrapolate trace recordings into areas void of receivers. Normally the wavefield and/or its derivatives are only known at a number of discrete locations. However, in practice it is often desirable to extend the knowledge of the wavefield to other points using interpolation, extrapolation or a combination of extrapolation and interpolation, sometimes known as intrapolation. As used herein, the terms "interpolate" and "interpolation" will refer generally to any one of interpolation, extrapolation, and intrapolation unless noted otherwise to specifically mean interpolation to the exclusion of extrapolation and interpolation.

The sensors 101, shown in FIG. 1, generate data representative of the reflections, and the seismic data is embedded in electromagnetic signals. Note that the generated data is multicomponent seismic data. The signals generated by the sensors 101 are communicated to a computing apparatus, such as the computing apparatus 700 in FIG. 7. The computing apparatus 700 collects the seismic data for processing. The computing apparatus 700 is centrally located on the survey vessel 11. However, as will be appreciated by those skilled in the art, various portions of the computing apparatus 700 may be distributed in whole or in part, e.g., across the seismic recording array that is comprised of the streamers 10, in alternative embodiments.

The computing apparatus 700 may process the seismic data itself, store the seismic data for processing at a later time, transmit the seismic data to a remote location for processing, or some combination of these things. Typically, processing occurs on board the survey vessel 11 or at some later time rather than in the survey vessel 11 because of a desire to maintain production. The data may therefore be stored on a portable magnetic storage medium or wirelessly transmitted from the survey vessel 11 to a processing center (not shown) for processing in accordance with the present invention. Typically, in a marine survey, this will be over satellite links. Typically, the multicomponent seismic data is stored on-site and then transmitted/transported to a central processing facility as discussed above. However, in some embodiments, the seismic data may be processed on-site (or even real-time) or archived prior to processing. In some cases where the seismic data is archived, it may even be archived over a period of years. Note that some alternative embodiments may employ multiple data collection systems.

Figure 7:
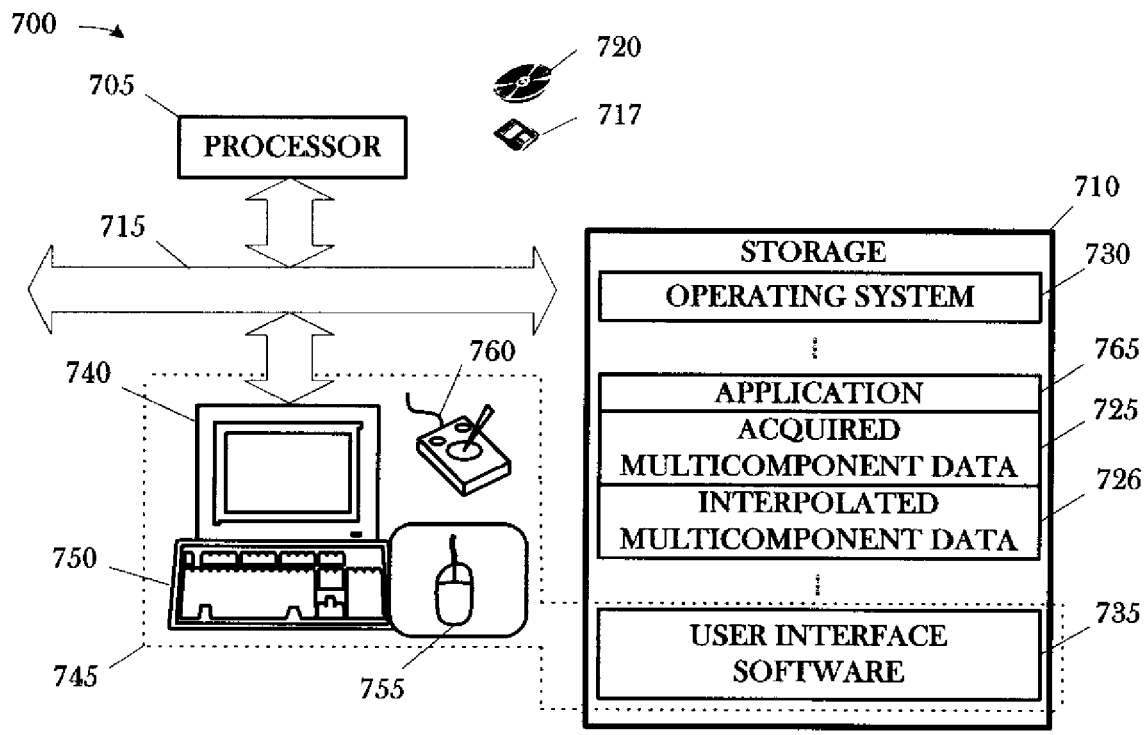
FIG. 7 shows selected portions of the hardware and software architecture of a computing apparatus such as may be employed in some aspects of the present invention.

Thus, in one aspect, the present invention is a software implemented method. FIG. 7 shows selected portions of the hardware and software architecture of a computing apparatus 700 such as may be employed in some aspects of the present invention. The computing apparatus 700 includes a processor 705 communicating with storage 710 over a bus system 715. The storage 710 may include a hard disk and/or random access memory ("RAM") and/or removable storage such as a floppy magnetic disk 717 and an optical disk 720.

The storage 710 is encoded with the multicomponent seismic data 725 acquired as described above. The storage 710 is also encoded with an operating system 730, user interface software 735, and an application 765. The user interface software 735, in conjunction with a display 740, implements a user interface 745. The user interface 745 may include peripheral I/O devices such as a keypad or keyboard 750, a mouse 755, or a joystick 760. The processor 705 runs under the control of the operating system 730, which may be practically any operating system known to the art. The application 765 is invoked by the operating system 730 upon power up, reset, or both, depending on the implementation of the operating system 730. The application 765, when invoked, performs the method of the present invention. The user may invoke the application in conventional fashion through the user interface 745.

Figure 8:
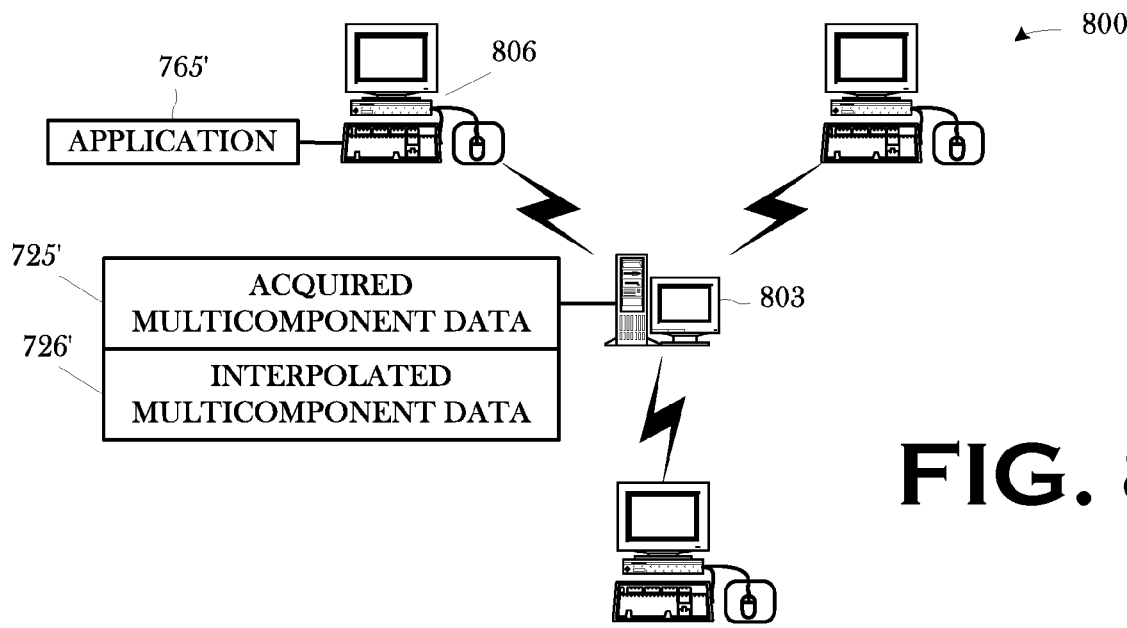
FIG. 8 depicts a computing system on which some aspects of the present invention may be practiced in some embodiments.

Note that there is no need for the multicomponent seismic data 725 to reside on the same computing apparatus 700 as the application 765 by which it is processed. Some embodiments of the present invention may therefore be implemented on a computing system, e.g. the computing system 800 in FIG. 8, comprising more than one computing apparatus. For example, the multicomponent seismic data 725 may reside in a data structure residing on a server 803 and the application 765' by which it is processed on a workstation 806 where the computing system 800 employs a networked client/server architecture.

However, there is no requirement that the computing system 800 be networked. Alternative embodiments may employ, for instance, a peer-to-peer architecture or some hybrid of a peer-to-peer and client/server architecture. The size and geographic scope of the computing system 800 is not material to the practice of the invention. The size and scope may range anywhere from just a few machines of a Local Area Network ("LAN") located in the same room to many hundreds or thousands of machines globally distributed in an enterprise computing system.

Figure 9:
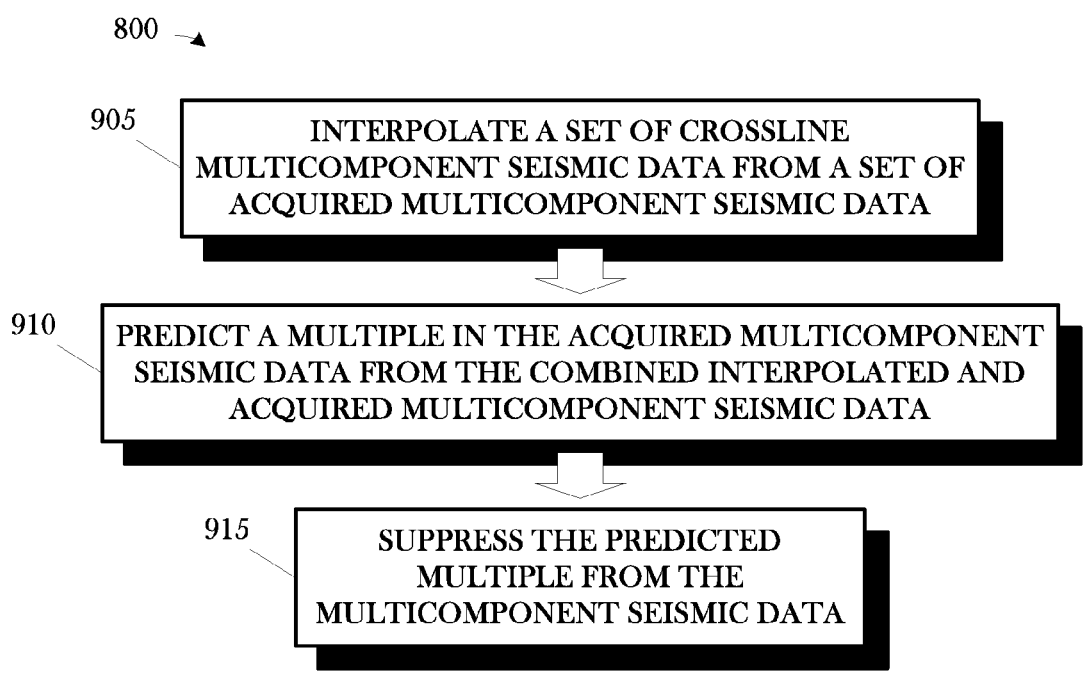
FIG. 9 illustrates one particular embodiment of a method practiced in accordance with the present invention.

FIG. 9 illustrates one particular embodiment of a method 900 practiced in accordance with the present invention and may be implemented in the application 765, shown in FIG. 7. In general, the method 900 comprises interpolating (at 905) a set of crossline seismic data from a set of acquired multicomponent seismic data; predicting (at 910) a multiple in the interpolated and acquired seismic data from the combined interpolated and acquired multicomponent seismic data; and suppressing (at 915) the predicted multiple. Note that, unlike the state of the art, the method 900 interpolates in the crossline direction. Each of these acts will now be discussed in greater detail.

As shown in FIG. 9, the method 900 begins with interpolating a set of crossline seismic data from a set of acquired multicomponent seismic data. The interpolation technique disclosed above is then applied to the acquired multicomponent seismic data and results in a set of interpolated seismic data. The interpolated seismic data is, in the illustrated embodiment, pressure data. The interpolated data is therefore not multicomponent data in the illustrated embodiment.

In this particular technique, the measured data from a multi-component streamer are used to derive a filter which interpolates or extrapolates pressure data away from the location of the streamer. The filter may be partially based on an expansion series of the pressure data. An expansion series is generally defined as a representation of the function or data set by means of a sum of increasing higher derivatives of the function or data set at a point or the space surrounding a point. One of the most used expansion series is the Taylor series. Whereas Taylor series are generally not suitable for extrapolating oscillatory functions over great distances, this technique is based on the realization that in seismic applications the waves arrive at the receivers with near vertical incidence. For certain applications, in particular for intrapolation between known points of the data set, it is a preferred variant of the present invention to use a Taylor series with modified weighting, more preferably weighting known as barycentric or triangular weighting.

Though expansion series have been proposed in seismic theory, they were severely restricted in real application because such expansions lead to cross-line terms which are difficult to evaluate. Lack of accurate particle velocity caused further problems: without such data, the errors made by intra- and extrapolation render the results unreliable. It has now been found that multi-component streamers are capable of providing sufficiently accurate particle velocity related data either directly or indirectly. In one embodiment, first-order cross-line derivatives of data in the filter or expansion series are substituted by in-line measurements of wavefield quantities only. In another embodiment, second-order cross-line derivatives of data in the filter or expansion series are further substituted by in-line derivatives and measurements of wavefield quantities. The expansion series is accurate to a first-order, more preferably to the second-order expansion term. It is desirable to extend the series into the highest order permitted by the available measurements of wavefield quantities. However, the terms involve more and more complex derivatives of the measured data. Hence such an extension is preferably limited to the term which can be replaced or expressed in terms of accurately measured data.

Note, however, that the interpolation/extrapolation technique first disclosed in the '299 application is but one such technique with which the invention may be implemented. Other suitable techniques are known to the art from their use in other contexts. Any suitable technique known to the art may be used in interpolating/extrapolation the acquired multicomponent seismic data to the source/receiver locations of the baseline survey that generated the legacy data or vice versa: in interpolating/extrapolation the acquired multicomponent seismic data baseline survey to the source/receiver locations of the repeat survey, or alternatively, both the base and repeat survey to a third location if both the base and repeat survey were acquired using a multicomponent acquisition system.

Furthermore, some embodiments might interpolate data in the inline direction. This is typically not necessary since spatial sampling concerns can be met by the composition of the streamer 10. That is, if higher spatial sampling is desired, sensors 101 may be placed more densely and in greater numbers on the streamer 10. Some embodiments might nevertheless choose to interpolate inline data. Note that this also implies that some embodiments might interpolate only in the crossline direction to the exclusion of the inline direction.

Figure 10:
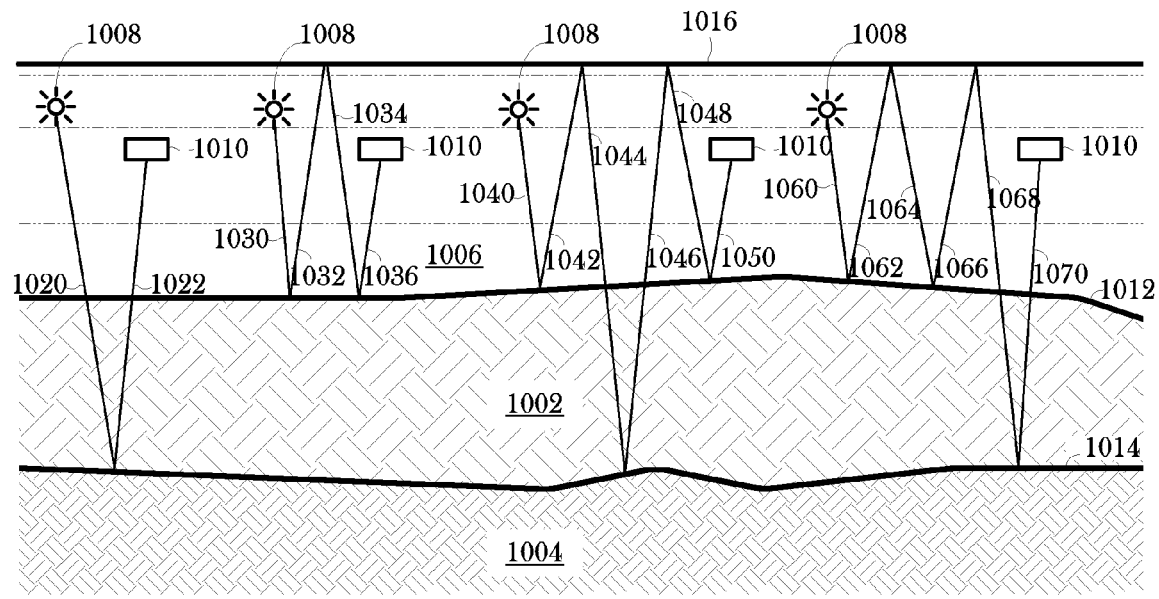
FIG. 10 conceptually illustrates the presence of multiples in a marine seismic survey.

The method 900 then continues by predicting (at 910) a multiple in the interpolated and acquired seismic data from the combined interpolated and acquired multicomponent seismic data. As briefly described above, the survey, shown in FIG. 1A-FIG. 1B, will also include multiple reflections, or multiples, and the processing will include suppression, or attenuation or removal, of the multiples from the multicomponent seismic data. FIG. 10 provides examples of different types of reflections in a marine seismic survey. Note that multiples occur analogously in land-based surveys. A seismic source 1008, such as an air gun, creates seismic waves in the body of water 1006 and a portion of the seismic waves travels downward through the water toward the subterranean formations 1002 and 1004 beneath the body of water 1006.

When the seismic waves reach a seismic reflector, a portion of the seismic waves reflects upward and a portion of the seismic waves continues downward. The seismic reflector can be the water bottom 1012 or one of the interfaces between subterranean formation, such as interface 1014 between formations 1002 and 1004. When the reflected waves traveling upward reach the water/air interface at the water surface 1016, a majority portion of the waves reflects downward again. Continuing in this fashion, seismic waves can reflect multiple times between upward reflectors, such as the water bottom 1012 or formation interfaces below, and the downward reflector at the water surface 1016 above, as described more fully below. Each time the reflected waves propagate past the position of a seismic receiver 1010, the receiver 1010 senses the reflected waves and generates representative signals.

Primary reflections are those seismic waves which have reflected only once, from the water bottom 1012 or an interface between subterranean formations, before being detected by a seismic receiver 1010. An example of a primary reflection is shown in FIG. 10 by raypaths 1020 and 1022. Primary reflections contain the desired information about the subterranean formations which is the goal of marine seismic surveying.

Surface multiples are those waves which have reflected multiple times between the water surface 1016 and any upward reflectors, such as the water bottom 1012 or formation interfaces, before being sensed by a receiver 1010. An example of a surface multiple which is specifically a water bottom multiple is shown by raypaths 1030, 1032, 1034 and 1036. The points on the water surface 1016 at which the wave is reflected downward are generally referred to as the downward reflection points. The surface multiple starting at raypath 1030 is a multiple of order one, since the multiple contains one reflection from the water surface 1016.

Two examples of general surface multiples with upward reflections from both the water bottom 1012 and formation interfaces are shown by raypaths 1040, 1042, 1044, 1046, 1048 and 1050 and by raypaths 1060, 1062, 1064, 1066, 1068 and 1070. Both of these latter two examples of surface multiples are multiples of order two, since the multiples contain two reflections from the water surface 1016. In general, a surface multiple is of order n if the multiple contains n reflections from the water surface 1016. Surface multiples are extraneous noise which obscures the desired primary reflection signal.

Thus, seismic data acquired through the seismic survey in FIG. 1A-FIG. 1B will include at least first order multiples such as are shown in FIG. 10. Note that some surveys might not produce higher order surface multiples in the seismic data. For instance, in some deep water marine surveys, higher order multiples may take too long to reach the relevant receivers to arrive within the acquisition time window for the survey. They will therefore be excluded from the seismic data. The acquired multicomponent seismic data 725, shown in FIG. 7, is then processed in accordance with the present invention on a computing apparatus, such as the computing apparatus 700, to suppress the multiples.

A large class of multiple prediction algorithms, predict multiples from primaries and lower-order multiples. Exemplary techniques include surface related multiple elimination ("SRME") and wave equation multiple attenuation ("WEMA"), as well as others known to the art. Note that WEMA is used on for seismic data acquired through marine surveys. Both SRME and WEMA may be used on either 2D or 3D seismic data. Particular SRME multiple prediction techniques are disclosed in the following references:

(1) U.S. application Ser. No. 10/668,927, filed Sep. 23, 2003, entitled "Method for the 3-D Prediction of Free-Surface Multiples," and published Mar. 24, 2005, ("the '927 application") which discloses a surface multiple prediction ("SMP") technique;

(2) U.S. application Ser. No. 60/560,223, filed Apr. 7, 2004, entitled "Fast 3-D Surface Multiple Prediction," which discloses a fast surface multiple predication ("FSMP") technique;

(3) U.S. application Ser. No. 60/560,129, filed Apr. 7, 2004, entitled "Generalized 3-D Surface Multiple Prediction," which discloses a generalized surface multiple predication ("GSMP") technique;

Another class of multiple prediction techniques, which may be referred to as "Amundsen" demultiple techniques for present purposes, are disclosed in:

(4) Amundsen, L., et al., "Attenuation of Free-Surface Multiples from Marine Pressure and Pressure Gradient," 65th Mtg. Eur. Assn. Geosci. Eng., P 192 (2003);

(5) Amundsen, L., 2001,"Elimination of Free-Surface Related Multiples Without Need of the Source Wavelet", 66 Geophysics, 327-341 (2001); and (6) Holvik, E., and Amundsen, L., "Elimination of the overburden response from multicomponent source and receiver seismic data, with source designature and decomposition into PP-, PS-, SP-, and SS-wave responses", 70 Geophysics 43-59 (2005).

A WEMA multiple prediction technique is taught in:
(7) Wiggins, J. W, "Attenuation of Complex Water-Bottom Multiples by Wave-Equation-Based Prediction and Subtraction," 53 Geophysics, 1627-1539 (1988).

References (1)-(3) are hereby expressly incorporated by reference as if set forth verbatim herein. However, any suitable technique for predicting multiples known to the art may be used. For instance, move-out based multiple suppression techniques and techniques originated by Dimitri Lochtanov ("Lochtanov demultiple techniques"), may also be used.

Figure 11B:
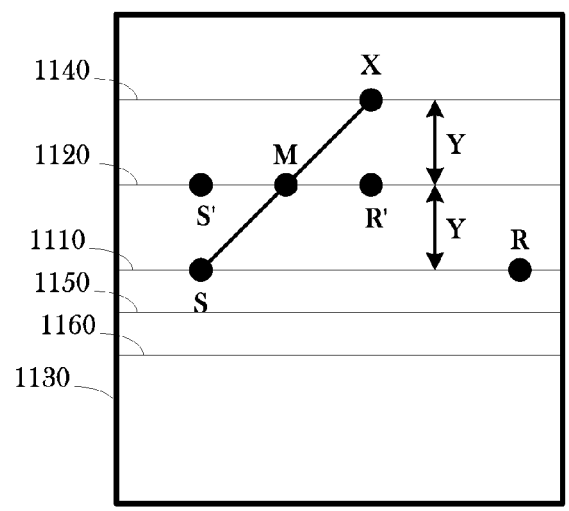
FIG. 11A-FIG. 11B illustrate the one particular technique for predicting a plurality of surface multiples for a plurality of traces in a record of seismic data.
Figure 11A:
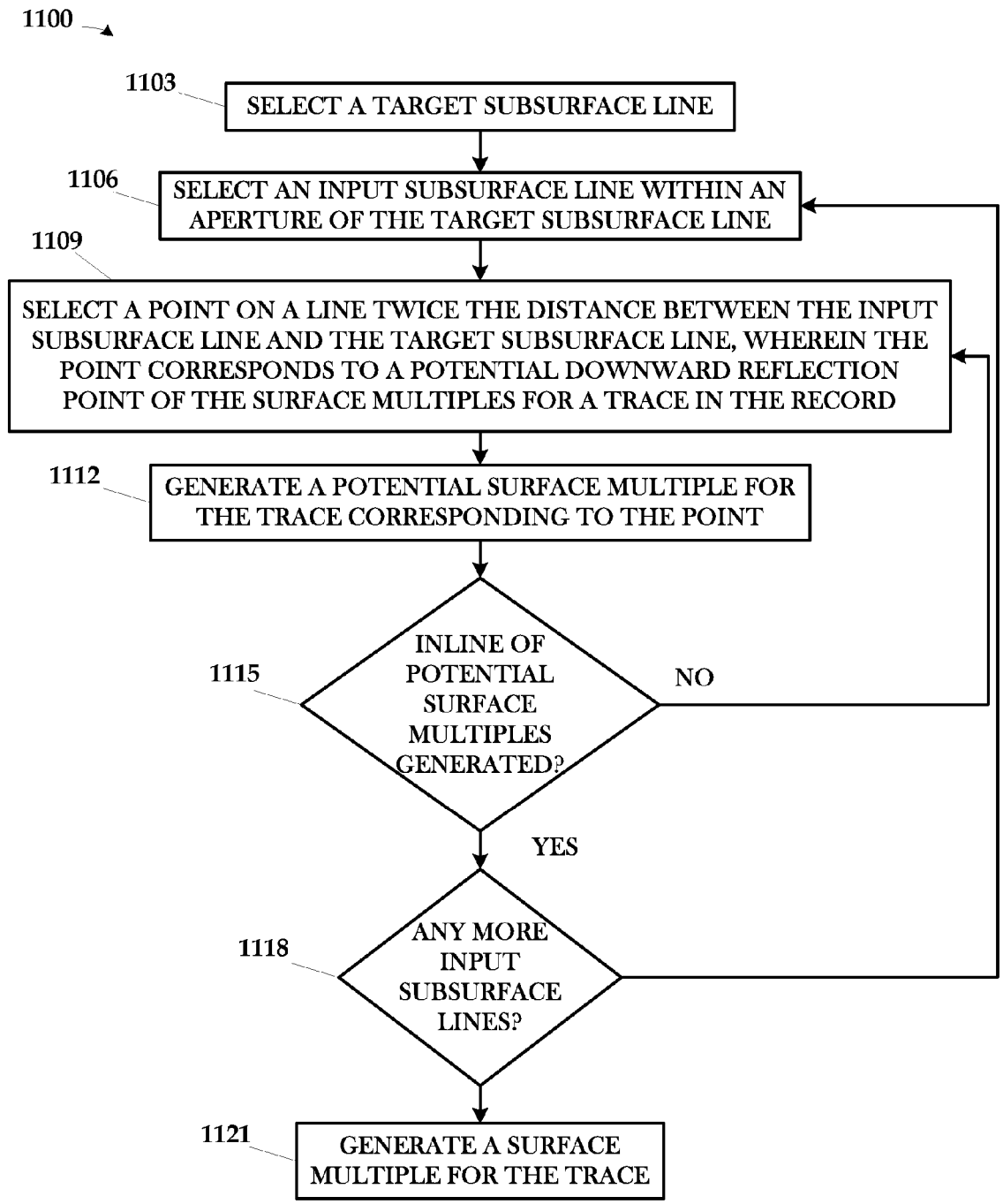

To further an understanding of the present invention, a suitable multiple prediction technique will now be disclosed more fully. More particularly, FIG. 11A-FIG. 11B illustrate the SMP technique 1100 of the '927 application for predicting a plurality of surface multiples for a plurality of traces in a record of seismic data. In FIG. 11B, for purposes of illustrating this technique, a specific trace on the target subsurface line 1110 for which the surface multiples are to be predicted has a source at S and a receiver at R, and is illustrated as trace (S, R). The trace (S, R) is selected from the target subsurface line 1110. A second subsurface line 1120 (hereinafter referred to as "input subsurface line") within a specified crossline aperture 1130 of the target subsurface line 1110 is selected.

The aperture 1130 is generally specified by a maximum distance Y from the target subsurface line 1110, which is generally positioned in the middle of the aperture 1130. The aperture 1130 generally consists of many potential input subsurface lines, one of which is the target subsurface line 1110. The term "aperture" is used in relation to the location of the input subsurface line 1120 and to the location of potential downward reflection points relative to the target subsurface line 1110. It should be noted, however, that the crossline distance Y from the target subsurface line 1110 to the potential downward reflection points is always twice that to the input subsurface line 1120, and hence, the crossline extent of the aperture 1130 defined in terms of potential downward reflection points is twice that defined in terms of input subsurface line 1120

Referring now to both FIG. 11A and FIG. 11B, the method 1100 begins by selecting (at 1103) a target subsurface line 1110. An input subsurface line 1120 within an aperture 1130 of the target subsurface line 1110 is then selected (at 1106). A point X is then selected (at 1109) on a line 1140 twice the distance between the input subsurface line 1120 and the target subsurface line 1110, wherein the point X corresponds to a potential downward reflection point of the surface multiples for a trace in the record. A potential surface multiple is then generated (at 1112) for the trace 1140 corresponding to the point X.

The point selection (at 1109) and potential surface multiple generation (at 112) are iterated (at 1115) for each point X on the line 1140. This generates an inline of potential surface multiples for the trace corresponding to each point X. The whole process is iterated (at 1118) each input subsurface line 1120 (e.g., the lines 1150, 1160) within the aperture 1130 of the target subsurface line 1110. This generates a plurality of potential surface multiples for the trace corresponding to each input subsurface line 1120 within the aperture 1130. The method 1100 then adds (at 1121) the plurality of potential surface multiples corresponding to each input subsurface line 1120 within the aperture 1130 to generate a surface multiple for the trace. This is repeated for each trace in the multicomponent seismic data to yield a set of predicted multiples for the multicomponent seismic data.

In many cases, it may be desirable to perform certain "corrections" to the multicomponent data. Some these corrections may be performed as a part of the multiples prediction. For instance, in FIG. 11A-FIG. 11B, only a portion of the input subsurface line 1120 is used, denoted (S', R'). A differential moveout correction is applied to trace (S', R') to simulate the trace (S, X). The differential moveout correction compensates for the difference in offset between the two traces, where the offset of a trace is defined to be the horizontal distance from the source to the receiver. The differential moveout correction is used here since traces (S, X) and (S', R') have the same midpoint location M. By applying the differential moveout correction, the source at location S' on the input SSL 1120 is transferred to location S on the target subsurface line 1110 and the receiver at location R' on the input SSL 1120 is transferred to location X on the locations-for-X line 1140. The differential moveout correction may be a differential normal moveout (NMO), although other differential moveout correction algorithms are also contemplated by embodiments of the invention.

Other corrections might be performed independent of the multiples predictions. For instance, it may sometimes be desirable to first perform what is known as a "static correction" on the multicomponent seismic data. Often called "statics," a static correction is a bulk shift of a seismic trace in time during seismic processing to "correct" for the effects of environmental anomalies. Generally, statics are caused by structural or velocity variations in the near surface. These variations may be spatial (e.g., elevation statics) or temporal (e.g., tidal statics). In marine surveys, common static corrections compensate for changes in tidal conditions and water velocity.

Primary corrections, or corrections in primary reflections (e.g., the reflect 645 in FIG. 1) intended improve the continuity of primary reflections are known to the art. The discontinuities in the original multicomponent seismic dataset will generally have been caused by anomalies related to changes in the subsurface over the acquisition time of the survey. Thus, these types of statics typically are spatial. In general, as was mentioned above, statics for primaries are known in the art and are typically a bulk shift of a seismic trace in time during seismic processing.

One suitable technique for use in temporal statics is disclosed in U.S. application Ser. No. 11/213,137, entitled "Handling of Static Corrections in Multiples Prediction," filed Aug. 8, 2005, in the name of Ian Moore. This application is hereby expressly incorporated by reference as if set forth verbatim herein. As noted therein, the term "temporal" refers anomalies varying over the acquisition time of the multicomponent seismic data. For example, tides and water velocities might vary over time during acquisition in a marine survey.

Note, however, that static corrections may not be applied in some embodiments. Or, spatial static corrections may be applied in the absence of temporal static corrections. Or, the opposite may occur. The invention admits wide variation in this aspect.

Returning to FIG. 9, the method 900 continues by suppressing (at 915) the predicted multiple. Note that "suppressing" is but one term describing the notion of mitigating the effects of multiples in the seismic data and that other terms such as "attenuation", "mitigation", and "removal", or variants thereon, are sometimes used. To further an understanding of the invention, one particular multiple suppression techniques shall now be disclosed. More particularly, the technique disclosed in U.S. Pat. No. 5,587,965, entitled "Surface Multiple Attenuation Via Eigenvalue Decomposition", issued Dec. 24, 1996, to Western Atlas International, Inc., as assignee of the inventors William H. Dragoset, Jr. and Zeljko Jericevic. The following is excerpted from that patent.

Figure 13:
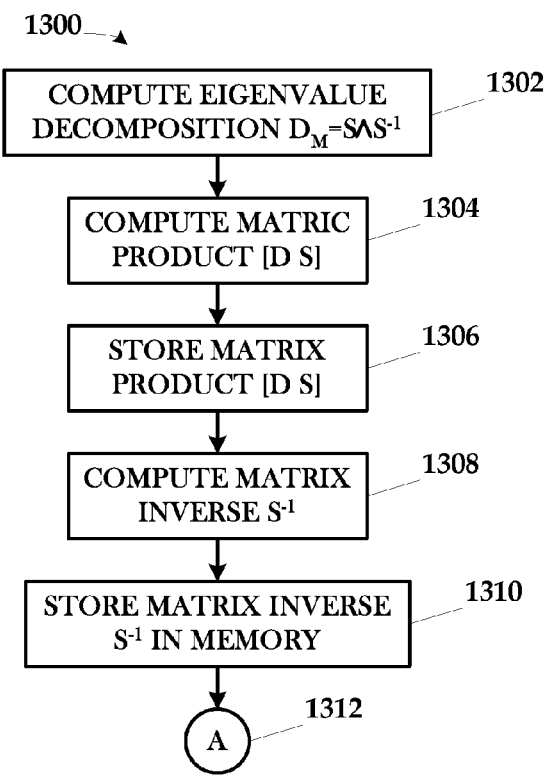
FIG. 13-FIG. 14 schematically diagram computation of the primary matrix for non-ideal data in the method of FIG. 12.
Figure 14:
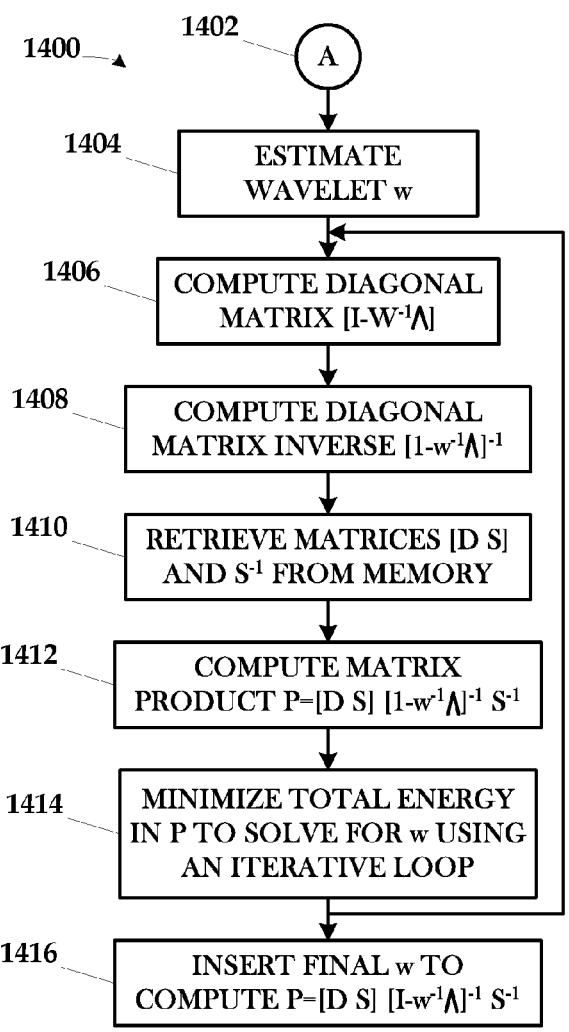

In the following discussion, let upper-case letters represent the original seismic wavefields, the corresponding recorded data sets, or the corresponding data cubes or matrices. This particular method for substantially eliminating, or attenuating, surface multiples from a marine seismic signal is illustrated in FIG. 13-FIG. 14. In general, the marine seismic signal is truncated in time in the time domain. Both the marine seismic signal and the truncated signal are transformed from time domain into frequency domain and represented by matrices D and DT, respectively. Eigenvalue decomposition:

$$D_T = S \cdot \Lambda \cdot S^{-1} \tag{12}$$

is computed, where:

$\Lambda$=the diagonal matrix whose elements are the eigenvalues of $D_T$;

S=the square matrix whose rows are the corresponding eigenvectors of $D_T$; and $S^{-1}$ the matrix inverse of S.

Matrix product D·S is computed and saved in memory and matrix inverse $S^{-1}$ is computed and saved in memory. An initial estimate for the source wavelet w is made. Diagonal matrix $[I-w^{-1}\Lambda]$ is computed and the matrix inverse $[I-w^{-1}\Lambda]^{-1}$ is computed. The matrix product D·S and matrix inverse $S^{-1}$ are retrieved from memory and the matrix product $[D\cdot S][I-w^{-1}\Lambda]^{-1}S^{-1}$ is computed. The source wavelet w is computed by minimizing the total energy in the matrix product $[D\cdot S][I-w^{-1}\Lambda.]^{-1}S^{-1}$, using an iterative loop. Primary matrix P is computed by inserting the computed value for the source wavelet w into the expression $P=[D\cdot S][I-w^{-1}\Lambda.]^{-1}S^{-1}$. Finally, matrix P is inverse transformed from frequency domain into time domain.

In the following discussion, let upper-case letters represent the original seismic wavefields, the corresponding recorded data sets, or the corresponding data cubes or matrices. Thus let D represent a marine seismic data set corresponding to a wavefield D. The wavefield D can be divided into two parts, $$D = P + M \tag{13}$$

The primary wavefield, P, represents that portion of D which contains no surface multiples. The surface multiples wavefield, M, represents that portion of D which contains surface multiples of any order. Surface multiple attenuation is a processing method for removing the multiples wavefield M from the recorded wavefield D to yield the desired primary wavefield P.

For each i from 1 to $\infty$, let $M_i$ represent that portion of M containing surface multiples of order i. Then the surface multiple wavefield M can be further decomposed into an infinite sum of different orders, $$M = M_1 + M_2 + \ldots + M_i + \tag{14}$$

Recorded data sets have a finite duration, so only a finite number of terms from Eq. (14) are needed to represent the corresponding wavefield. Substituting an appropriately truncated Eq. (14) into Eq. (13) yields $$D=P+M_1+M_2+\ldots+M_n \quad (15)$$

for some value n.

The process of surface multiple attenuation assumes that surface multiple events $M_i$ of order i can be predicted from knowledge of both the surface multiple events $M_{i-1}$ of order i-1 and the primary wavefield P. This assumption means that there exists some mathematical operator O such that $$M_i = POM_{i-1} \quad (16)$$

Inserting Eq. (16) into Eq. (15) and factoring out first P and then O yields:

$$D=P+POP+POM_1+ \ldots +POM_{n-1}=P[1+O(P+M_1+\ldots+M_{n-1})] \quad (17)$$

Define a truncated version of D by $$D_T=P+M_1+\ldots+M_{n-1}=D-M_n \quad (18)$$

In practice, as will be discussed later, $D_T$ would be approximated by truncating the traces in D in time rather than actually constructing and subtracting $M_n$ from D. Inserting Eq. (18) into Eq. (17) yields the compact form $$D=P[1+OD_T] \quad (19)$$

Eq. (19) is a formula for recursive forward modeling of surface multiples. Eq. (19) represents adding the events of order n to the wavefield containing all events up to and including order n−1. If the bracketed expression in Eq. (19) has an inverse, then Eq. (19) can be inverted to yield $$P=D[1+OD_T]^{-1} \quad (20)$$

Eq. (20) is the inverse of the recursive forward modeling equation, Eq. (19). Eq. (20) states that if a suitable operator O can be found, then the primary wavefield P, free of surface multiples, can be computed directly from the recorded wavefield D. The operator O being suitable means that the operator O must be both geophysically and mathematically plausible. The operator O being geophysically plausible means that the operator O satisfies Eq. (16). The operator O being mathematically plausible means firstly that the factorizations in Eq. (17) are valid and secondly that the inverse of the bracketed expression in Eq. (19) exists and thus Eq. (20) is valid.

Let lower-case letters represent individual traces or events within the wavefields or data sets. Thus $m_i$ is a multiple event of order i within a trace d in the wavefield D. Riley and Claerbout, "2-D Multiple Reflections" Geophysics, vol. 41, 1976, pp. 592-620, derive the one-dimensional versions of Eqs. (19) and (20). Assume that the earth has a single, flat, reflecting layer, is laterally homogeneous and the marine source creates a spike-like plane wave traveling vertically downward. Under these conditions, every trace in the wavefield D is the same, so the entire wavefield D can be represented by a single trace d. Letting the reflection coefficient of the water surface be −1, the following recursive formula holds for predicting the surface multiple event $m_i$ of order i from the surface multiple event $m_{i-1}$ of order i−1 and the primary event p in the trace d, $$m_i=-p^*m_{i-1} \quad (21)$$

where * represents convolution in the time domain. Eq. (21) is a one-dimensional version of Eq. (16). Here, the operator O has become convolution followed by multiplication by −1.

The factorizations in Eq. (17) are mathematically valid since convolution is a commutative process. The inversion in Eq. (20) is mathematically valid since it is simply deconvolution. In this case, the one-dimensional version of Eq. (20) becomes $$p=d^*[1-d_T]^{-1} \quad (22)$$

The expression in brackets in Eq. (22) acts as a filter whose inverse deconvolves the surface multiples in trace d. Eq. (22) works equally well for one-dimensional models of surface multiple attenuation having any number of reflective layers.

Directly applying Eq. (21) and Eq. (22) to the two- or three-dimensional cases of surface multiple attenuation is not practical, however. A two- or three-dimensional version of Eq. (21) must honor the wave equation. The Kirchhoff integral, a mathematical statement of Huygens' principle, does honor the wave equation. The Kirchhoff integral provides a two- or three-dimensional generalization of Eq. (21), and, thus, is the basis of a geophysically suitable operator O. Several different approaches to two-dimensional surface multiple attenuation are described in the literature. Riley and Claerbout, "2-D Multiple Reflections", Geophysics, vol. 41, 1976, pp. 592-620, extend their one-dimensional deconvolution to two-dimensional using a finite difference scheme based on the scalar wave equation and using information on the source wavelet and reflectivities. Fokkema and Van den Berg, "Removal of Surface-Related Wave Phenomena: the Marine Case" 60th Annual International Meeting, SEG, Expanded Abstracts, 1990, pp. 1689-1692, describe a method of removing surface multiples that is derived from the Rayleigh reciprocity theorem. Solution is by direct matrix inversion or an iterative Neumann series, using information about the source wavelet and water layer properties. Verschuur, "Surface-Related Multiple Elimination in Terms of Huygens' Sources", J. of Seismic Exploration, vol. 1, 1992, pp. 49-59, and Verschuur et al, "Adaptive Surface-Related Multiple Elimination" Geophysics, vol. 57, no. 1, 1992, pp. 1166-1177, solve the surface multiple problem using an f−x domain method based on Huygens' principle, using information about the source wavelet and free surface reflectivity properties. A scaled estimate of the source wavelet may be adaptively calculated Carvalho et al., "Examples of a Nonlinear Inversion Method Based on the T Matrix of Scattering Theory: Application to Multiple Suppression", 61st Annual International Meeting, SEG, Expanded Abstracts, 1991, pp. 1319-1322, formulate a method of multiple suppression in terms of T-matrix scattering theory, using an estimate of the source wavelet. All of these methods are closely related because all of them must honor the acoustic wave equation.

Use of the Kirchhoff integral provides the appropriate two- or three-dimensional generalization of the inverse of the recursive forward modeling equation for surface multiple attenuation, as given in general by Eq. (20) and in one-dimensional form by Eq. (22). The following discussion focuses on a two-dimensional implementation of surface multiple attenuation. The Kirchhoff integral must be made compatible with Eq. (16)-Eq. (20). First, the recorded marine seismic data are Fourier transformed from the time domain to the frequency domain. Let p and m represent single-frequency components of Fourier-transformed traces. For example, $m_i(S,R)$ is one frequency component of the trace whose source and receiver were at positions S and R, respectively, and which contains only surface multiples of order i. Let $m_{M,i-1}$ represent $m_{i-1}$ after being modified to include the scale and phase corrections and the obliquity factor required by the Kirchhoff integral. The Kirchhoff modification is given by $$m_{M,i-1}(x, R) = (1-j)\sqrt{\frac{\omega}{4\pi}} \cos\left[\sin^{-1}\left(k_x \frac{V}{\omega}\right)\right] m_{i-1}(x, R) \quad (23)$$

where
    x=inline coordinate,
    $j=(-1)^{1/2}$
    $\omega$=angular frequency,
    $k_x$=x-component of wavenumber vector, and
    V=speed of sound in water.

Because of $k_x$, the modification of $m_{i-1}$ is dip-dependent. In the frequency domain, the Kirchhoff integral can be written as $$m_i(S,R) = -\int p(S,x) m_{M,i-1}(x,R) dx \quad (24)$$

As in Eq. (21), the minus sign is due to the negative reflection coefficient of the water surface.

In practice, recorded wavefields are not continuous in x, so the integral in Eq. (24) has to be replaced by the following discrete summation over x $$m_i(S,R) = -\Sigma p(S,x) m_{M,i-1}(x,R) \quad (25)$$

Except for the minus sign, Eq. (25) is the formula for computing one element of the product of two matrices. Thus, define $M_{i-1}$ as the matrix whose columns are the common-receiver records, $m_{i-1}(x,R)$, define $M_{M,i-1}$ as the matrix whose columns are the Kirchhoff-modified common-receiver records, $m_{M,i-1}(x,R)$, and define P as the matrix whose rows are the common-shot records, p(S, x). Then Eq. (25) becomes $$M_i = -P \cdot M_{M,i-1} \quad (26)$$

Since the matrix indices are the shot and receiver coordinates, the zero-offset traces lie along the main diagonal of each matrix. If the operator O in Eq. (16) is matrix multiplication and the quantities in uppercase are matrices, then Eq. (16) becomes Eq. (26) and so Eq. (20) becomes $$P = D[I - D_M]^{-1} \quad (27)$$

where I is the identity matrix and the "−1" superscript indicates matrix inversion.

For ideal data, Eq. (27) provides a simple algorithm for two-dimensional surface multiple attenuation. By "ideal" is meant that the wavefield is recorded broadband, contains no noise, has all wavelet effects, including source and receiver ghosts, removed, and has a trace-offset range that begins at zero offset. Furthermore, each individual sample within the data set D must have a true relative amplitude with respect to every other sample within D. All of the traces in a data set are Fourier-transformed and inserted into a data cube, D(S,R, t). Here S is source position, R is receiver position, and f is frequency. Next, the original traces are also truncated in time, Fourier-transformed, Kirchhoff-modified, and inserted into another data cube, $D_M$(S, R, f). For each frequency f, matrices D(S, R) and $D_M$(S,R) are extracted from the data cubes D and $D_M$, respectively, and inserted into Eq. (27). A matrix inversion and a matrix multiplication yields primary matrix P(S, R), which is inserted into an output data cube, P(S,R,f). Finally, each trace in data cube P is inverse Fourier transformed and reorganized into gathers.

For non-ideal data, wavelet effects have not been removed and are the major factor which must be taken into consideration. According to the convolutional model, a recorded seismic trace consists of a possibly time varying wavelet convolved with the earth's reflection series. The wavelet contains a component related to the acquisition equipment, called the source wavelet, and a component due to earth attenuation and absorption. The impact of the earth component on surface multiple attenuation can be seen by considering how Eq. (21) is affected. If the earth component is significant, then events p, $m_i$ and $m_{i-1}$ will each contain a particular wavelet that represents the effects that the earth has on the corresponding wavefield propagating through the earth. Since the total earth layers traversed by event $m_i$ is just the sum of the earth layers traversed by event p and event $m_{i-1}$, the wavelet in $m_i$ will, according to the convolutional model, simply be a convolution of the other two wavelets. Thus, any wavelet effects due to propagation through the earth appear identically on the two sides of Eq. (21), so surface multiple attenuation is not affected by earth filtering.

In contrast, if the three events each contain the same source wavelet, that wavelet will appear twice on the right side of Eq. (21), but only once on the left side. Therefore, Eq. (21) no longer holds for this case, and surface multiple attenuation cannot be accomplished by applying Eq. (22). In theory, this problem is easily fixed by redefining operator O to include a convolution by the inverse of the source wavelet w. Eq. (27) becomes $$P = D[I - w^{-1} D_M]^{-1} \quad (28)$$

where $w^{-1}$ is the wavelet inverse. Since Eq. (28) is in the frequency domain, convolution is accomplished by multiplication. In practice, however, the source wavelet w is initially unknown.

The source wavelet w can be found by minimizing the total energy in P in Eq. (28). When w=0 in Eq. (28), the total energy in P is the same as that in D, so no surface multiple attenuation occurs. As the inverse wavelet amplitude increases, Eq. (28) begins to attenuate the surface multiples, so the total energy in P decreases. If, however, the inverse wavelet amplitude becomes too large, then Eq. (28) overpredicts the surface multiples and the total energy in P begins to rise. The total energy minimum occurs when the inverse wavelet exactly compensates for the source wavelet. Thus surface multiple attenuation becomes an $L_2$-norm minimization problem, which has standard solutions, such as the conjugate gradient technique. One could also minimize other measures of the surface multiple energy in P.

Figure 12:
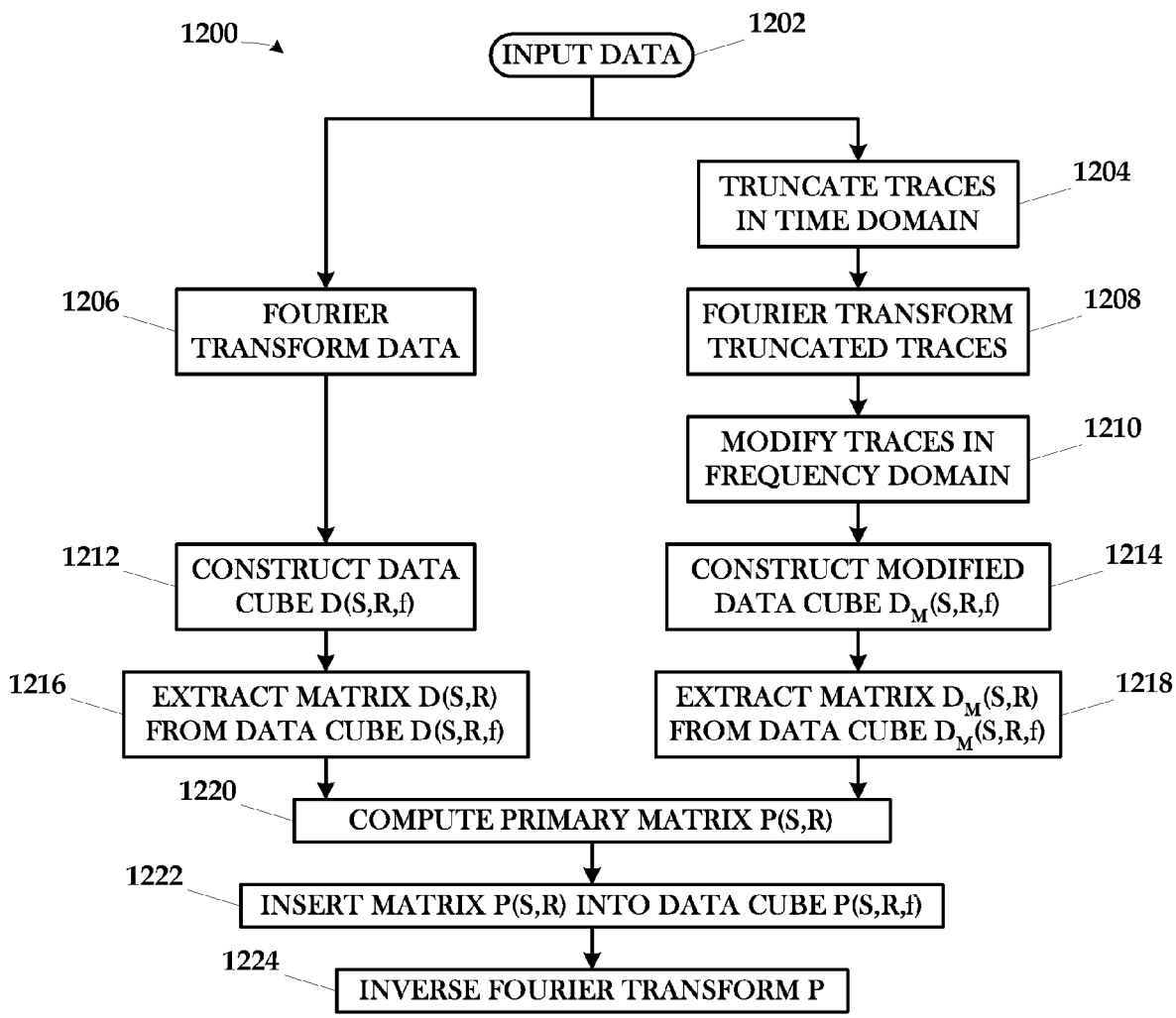
FIG. 12 is a schematically diagrams a general method of surface multiple attenuation.

FIG. 12 shows a schematic diagram of the general method (at 1200) for attenuating surface multiples from a marine seismic signal. A two-dimensional marine data set is recorded (at 1202) as a seismic signal. The traces which comprise the data set are truncated in time (at 1204). Both the recorded data (from 1202) and the truncated traces (from 1204) are Fourier transformed (at 1206, 1208, respectively) from the time domain into the frequency domain. The transformed truncated traces are modified (at 1210) in the frequency domain to include the obliquity, scale and phase factors required by the Kirchhoff integral and given by Eq. (23). The transformed data are used (at 1212) to construct a data cube D(S,R,f). Here S is source location, R is receiver location, and f is frequency. The modified traces are used (at 1214) to construct another data cube, the modified data cube $D_M$(S,R,f). Next, this series of steps (at 1216, 1218, 1220 and 1222) are repeated for each value of frequency f in data cube D(S,R,f). Thus, for each frequency f, a matrix D(S,R) is extracted (at 1216) from data cube D(S,R,f), and a modified matrix $D_M$(S,R) is extracted (at 1218) from modified data cube $D_M$(S,R,f). For each frequency f, the primary matrix P(S,R) is computed (at 1220) from matrices D(S,R) and $D_M$(S,R). The computation of the matrix P (in 1220) involves the solving of Eq. (20) as given by either Eq. (27) or Eq. (28) and will be discussed in greater detail below. For each frequency f, the matrix P(S,R) is inserted (at 1222) into data cube P(S,R,f), thus constructing the primary data cube P. Finally, the data cube P is inverse Fourier transformed (at 1224) from the frequency domain into the time domain.

FIG. 13 and FIG. 14 show schematic diagrams for computing primary matrix P(S,R), as designated (at 220) in FIG. 12, for non-ideal data. The preliminary steps of the method (at 1300) are shown in FIG. 13. An eigenvalue decomposition $D_M = S \cdot \Lambda \cdot S^{-1}$ of the modified matrix $D_M(S,R)$ is computed (at 1302). Here the rows of matrix S(S,R) are constructed from the eigenvectors of modified matrix $D_M$ and matrix $\Lambda.(S,R)$ is a diagonal matrix whose diagonal elements are the corresponding eigenvalues of modified matrix $D_M$. Matrix product D·S is computed once (at 1304) and then the matrix product D·S is saved (at 1306) in memory. Matrix inverse $S^{-1}$ of the matrix S is also computed once (at 1308) and then the matrix inverse $S^{-1}$ is also saved (at 1310) in memory. The flow of the method in the schematic diagram of FIG. 13 continues (at 1312) onto FIG. 14.

The remaining steps comprising the iterative loop in the method of the present invention for computing matrix P(S,R) are shown (at 1400) in FIG. 14. The flow continues (at 1402) onto point at which the schematic diagram of FIG. 14 from FIG. 13 (at 1312). An initial estimate for the value of the complex scalar representing the source wavelet w is made (at 1404). Diagonal matrix $[I-w^{-1}\Lambda.]$ is computed (at 1406). Here, I is the identity matrix. The matrix inverse $[I-w^{-1}\Lambda.]$ is computed (at 1408). The matrix product D·S and the matrix inverse $S^{-1}$ are retrieved from memory (at 1410). An expression for the primary matrix P(S,R) is computed from the matrix product given by Eq. (21), $$P = [D \cdot S][I - w^{-1}\Lambda]^{-1} S^{-1} \quad (29)$$

as a function of the wavelet w (at 1412). A value for the source wavelet w is computed by minimizing (at 1414) the total energy in the expression for P in w. The minimization is accomplished by an iterative loop (of 1406, 1408, 1410, 1412 and 1414). Finally, matrix P(S,R) is computed (at 1416) by inserting the final computed value for the source wavelet w into the expression given by Eq. (21), $$P = [D \cdot S][I - w^- . \Lambda.]^{-1} S^{-1} \quad (30)$$

In conclusion, the present invention replaces one matrix in the surface multiple attenuation inversion equation, given in Eq. (28), by its eigenvalue decomposition, given in Eq. (17). The structure of the surface multiple attenuation inversion equation allows factorization, after the eigenvalue decomposition, in such a way that the resulting matrix to be inverted is now diagonal, as in Eq. (21). This, in turn, allows many inversions of the diagonal matrix at a much smaller cost. In the published literature dealing with implementing the surface multiple attenuation equation, the matrix inversion is approximated by performing a series expansion of the matrix. The present invention is superior because it provides an exact solution rather than an approximate solution. In addition, the present invention determines the average source wavelet imbedded in the wavefield. Furthermore, in an alternative embodiment, small values in the diagonal matrix $[I-w^{-1}\Lambda]$ can be ignored once they are found, as well as the corresponding eigenvectors in S and the corresponding row vectors in $S^{-1}$. This technique can improve the numerical stability of the matrix inversion calculation and further decrease the computational cost. In another alternative embodiment, the matrix computations in the iteration steps may be carried out for predetermined groups of frequencies, such as swaths of frequencies, rather than for each individual frequency. This technique will further reduce the computational cost.

As is apparent from the above discussion, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method, comprising:
    interpolating a set of crossline seismic data from a set of acquired multicomponent seismic data;
    predicting a multiple in the interpolated and acquired seismic data from the combined interpolated and acquired multicomponent seismic data; and
    suppressing the predicted multiple;
    wherein the interpoloating, predicting, and suppressing are performed on a computing apparatus.

2. The computer-implemented method of claim 1, wherein interpolating the crossline seismic data includes intrapolating or extrapolating the crossline seismic data.

3. The computer-implemented method of claim 1, wherein interpolating the crossline seismic data includes interpolating and extrapolating the crossline seismic data.

4. The computer-implemented method of claim 1, wherein the acquired multicomponent seismic data includes pressure data and particle motion related data.

5. The computer-implemented method of claim 1, wherein interpolating the set of crossline seismic data includes employing functions of in-line measurements of wavefield quantities or derivatives of measurements of wavefield quantities in the interpolating filter.

6. The computer-implemented method of claim 1, wherein interpolating the set of crossline seismic data includes employing functions of in-line measurements of wavefield quantities and derivatives of measurements of wavefield quantities in the interpolating filter.

7. The computer-implemented method of claim 1, wherein predicting the multiple includes performing a surface related multiple elimination.

8. The computer-implemented method of claim 1, wherein performing the surface related multiple elimination includes performing one of surface multiple prediction, fast surface multiple prediction, generalized surface multiple prediction, or 3D Amundsen demultiple prediction.

9. The computer-implemented method of claim 1, further comprising interpolating a set of inline multicomponent seismic data from the acquired multicomponent seismic data.

10. The computer-implemented method of claim 1, wherein predicting the multiple includes predicting the multiple using one of surface related multiple elimination, wave equation multiple attenuation, Amundsen multiple prediction, move-out based multiple suppression, and Lochtanov multiple prediction.

11. A program storage medium, encoded with instructions that, when executed by a computing device, perform a method comprising:
   interpolating a set of crossline seismic data from a set of acquired multicomponent seismic data;
   predicting a multiple in the interpolated and acquired seismic data from the combined interpolated and acquired multicomponent seismic data; and
   suppressing the predicted multiple.

12. The program storage medium of claim 11, wherein interpolating the crossline seismic data in the method includes intrapolating or extrapolating the crossline seismic data.

13. The program storage medium of claim 11, wherein interpolating the crossline seismic data in the method includes interpolating and extrapolating the crossline seismic data.

14. The program storage medium of claim 11, wherein the acquired multicomponent seismic data in the method includes pressure data and particle motion related data.

15. The program storage medium of claim 11, wherein interpolating the set of crossline seismic data includes employing functions of in-line measurements of wavefield quantities or derivatives of measurements of wavefield quantities in the interpolating filter.

16. The program storage medium of claim 11, wherein interpolating the set of crossline seismic data includes employing functions of in-line measurements of wavefield quantities and derivatives of measurements of wavefield quantities in the interpolating filter.

17. The program storage medium of claim 11, wherein predicting the multiple in the method includes performing a surface related multiple elimination.

18. The program storage medium of claim 11, wherein performing the surface related multiple elimination in the method includes performing one of surface multiple prediction, fast surface multiple prediction, generalized surface multiple prediction, or 3D Amundsen demultiple prediction.

19. The program storage medium of claim 11, wherein the method further comprises interpolating a set of inline multicomponent seismic data from the acquired multicomponent seismic data.

20. The program storage medium of claim 11, wherein predicting the multiple in the method includes predicting the multiple using one of surface related multiple elimination, wave equation multiple attenuation, Amundsen multiple prediction, move-out based multiple suppression, and Lochtanov multiple prediction.

21. A computing apparatus, comprising:
   a processor;
   a bus system;
   a storage communicating with the processor over the bus system; and
   a software application residing on the storage that, when executed by the processor, performs a method comprising:
      interpolating a set of crossline seismic data from a set of acquired multicomponent seismic data;
      predicting a multiple in the interpolated and acquired seismic data from the combined interpolated and acquired multicomponent seismic data; and
      suppressing the predicted multiple.

22. The computing apparatus of claim 21, wherein interpolating the crossline seismic data in the method includes intrapolating or extrapolating the crossline seismic data.

23. The computing apparatus of claim 21, wherein interpolating the crossline seismic data in the method includes interpolating and extrapolating the crossline seismic data.

24. The computing apparatus of claim 21, wherein the acquired multicomponent seismic data in the method includes pressure data and particle motion related data.

25. The computing apparatus of claim 21, wherein interpolating the set of crossline seismic data includes employing functions of in-line measurements of wavefield quantities or derivatives of measurements of wavefield quantities in the interpolating filter.

26. The computing apparatus of claim 21, wherein interpolating the set of crossline seismic data includes employing functions of in-line measurements of wavefield quantities and derivatives of measurements of wavefield quantities in the interpolating filter.

27. The computing apparatus of claim 21, wherein predicting the multiple in the method includes performing a surface related multiple elimination.

28. The computing apparatus of claim 21, wherein performing the surface related multiple elimination in the method includes performing one of surface multiple prediction, fast surface multiple prediction, generalized surface multiple prediction, or 3D Amundsen demultiple prediction.

29. The computing apparatus of claim 21, wherein the method further comprises interpolating a set of inline multicomponent seismic data from the acquired multicomponent seismic data.

30. The computing apparatus of claim 21, wherein predicting the multiple in the method includes predicting the multiple using one of surface related multiple elimination, wave equation multiple attenuation, Amundsen multiple prediction, move-out based multiple suppression, and Lochtanov multiple prediction.

* * * * *